(12) United States Patent
Jericevic et al.

(10) Patent No.: US 6,256,587 B1
(45) Date of Patent: Jul. 3, 2001

(54) METHOD FOR CORRECTING WELL LOG DATA FOR EFFECTS OF CHANGES IN INSTRUMENT VELOCITY (CABLE YO-YO)

(75) Inventors: Zeljko Jericevic; Antonio Fabirs, both of Houston, TX (US)

(73) Assignee: Baker Hughes, Inc., Houston, TX (US)

( * ) Notice: Subject to any disclaimer, the term of this patent is extended or adjusted under 35 U.S.C. 154(b) by 0 days.

(21) Appl. No.: 09/439,628

(22) Filed: Nov. 12, 1999

Related U.S. Application Data

(63) Continuation-in-part of application No. 09/193,448, filed on Nov. 17, 1998, now Pat. No. 6,154,704.

(51) Int. Cl.$^7$ .................................................. G06F 19/00
(52) U.S. Cl. ............................................................ 702/6
(58) Field of Search ........................ 702/6–13; 340/854.9; 73/152.02, 152.05, 152.44, 152.45

(56) References Cited

U.S. PATENT DOCUMENTS

| | | | |
|---|---|---|---|
| 5,019,978 | 5/1991 | Howard, Jr. et al. | 364/422 |
| 5,313,829 | 5/1994 | Paslay et al. | 73/151 |

OTHER PUBLICATIONS

Xiaobo Li, Antonio Fabris, Michael A. Frenkel and Alberto G. Mezzatesta; *High–Definition Lateral Log and its Application to the Study of Formation Resistivity*, The Fourth Well Logging Symposium of Japan, Sep. 24–25, 1998, pp. 1–7.

*Primary Examiner*—Donald E. McElheny, Jr.
(74) *Attorney, Agent, or Firm*—K. P. Sriram; Darryl M. Springs

(57) ABSTRACT

A method for correcting data measured by a well logging instrument for effects of cable yo-yo. The data are first preprocessed to reduce magnitude of spatial frequency components in the data occurring within a bandwidth of axial acceleration of the logging instrument which corresponds to the cable. Then eigenvalues of a matrix are shifted, over depth intervals where the smallest absolute value one of the eigenvalues changes sign, by an amount such that the smallest absolute value eigenvalue does not change sign. The matrix forms part of a system of linear equations by which the measurements made by the instrument are converted to values of a property of interest of earth formations. Artifacts which may remain in the data after the step of preprocessing are substantially removed by the eigenvalue shifting. In one embodiment, the step of preprocessing includes low pass filtering using a cutoff at the axial resolution limit of a sensor on the instrument. In another embodiment, preprocessing includes phase shifting the response of one sensor to another sensor on the instrument within the spatial frequency bandwidth of the cable yo-yo. Still another embodiment of preprocessing include phase synthesis of the response of one sensor to that of another sensor within the spatial frequency bandwidth of the cable yo-yo.

23 Claims, 18 Drawing Sheets

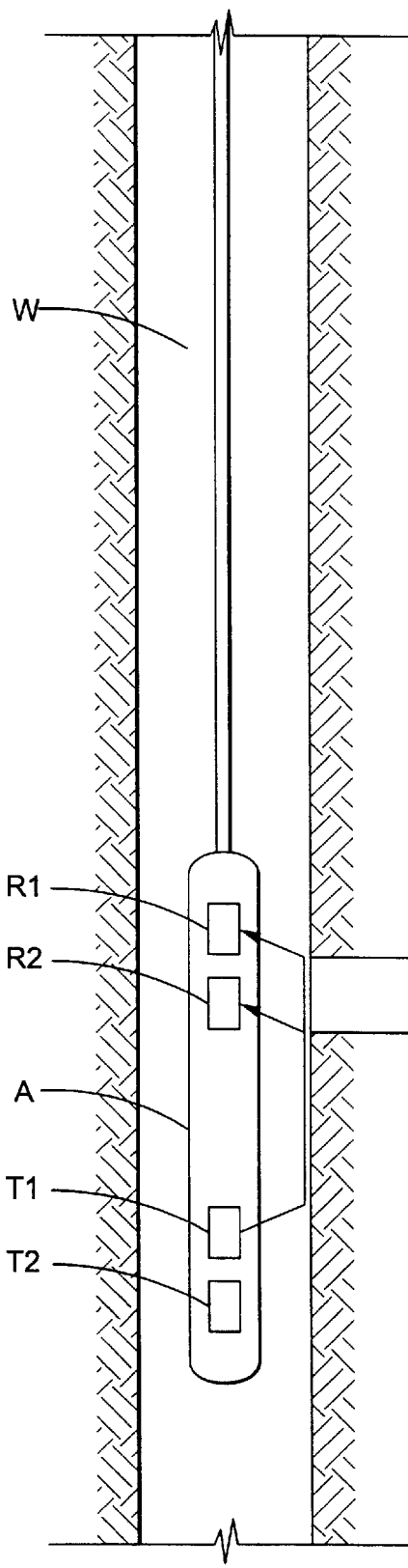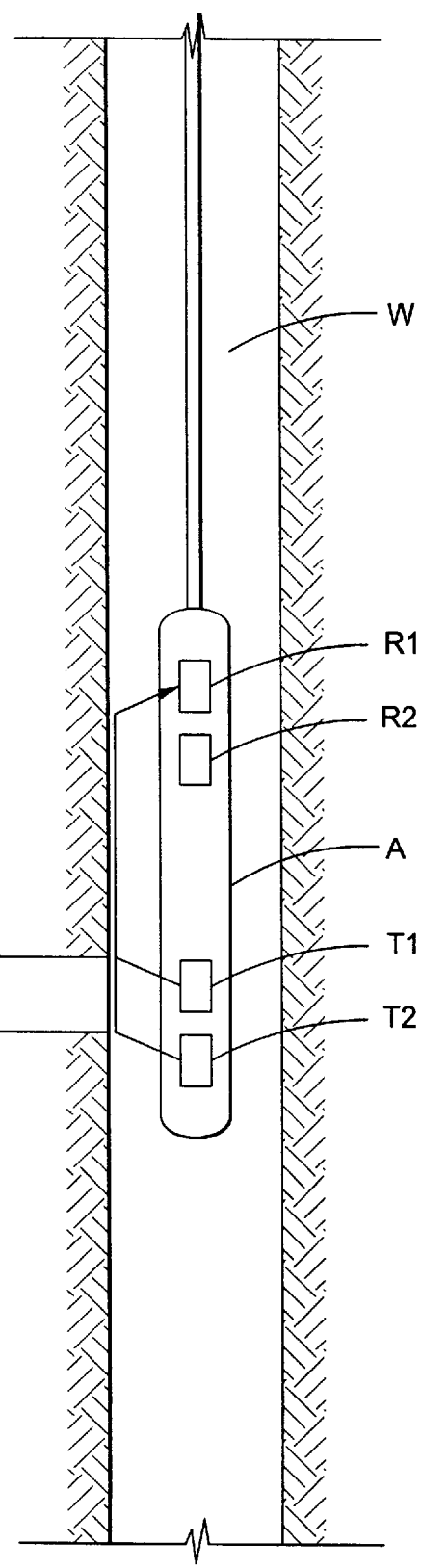
Fig. 1A
(PRIOR ART)
Fig. 1B
(PRIOR ART)

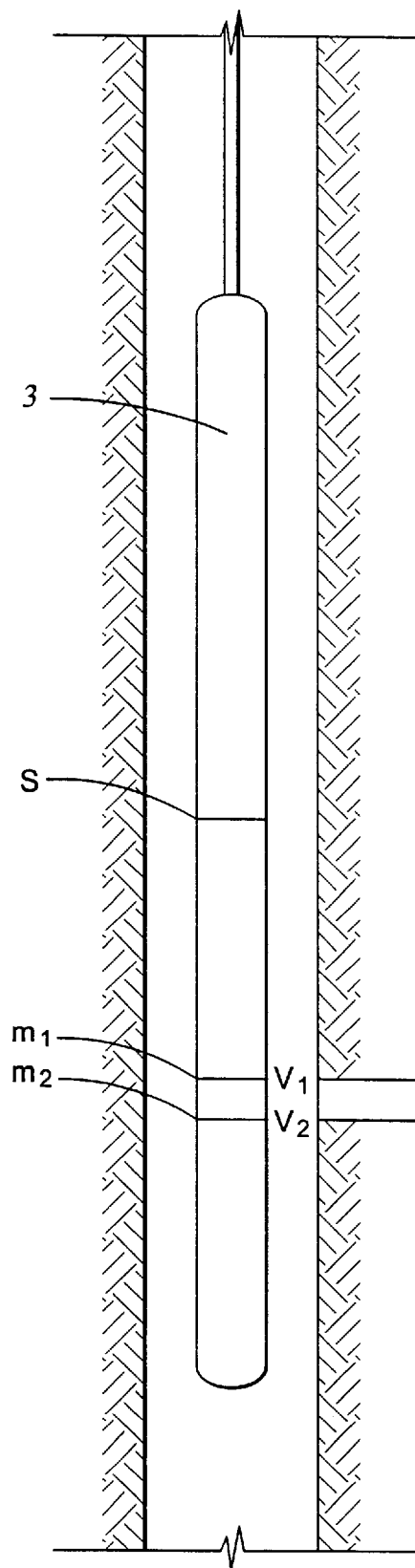
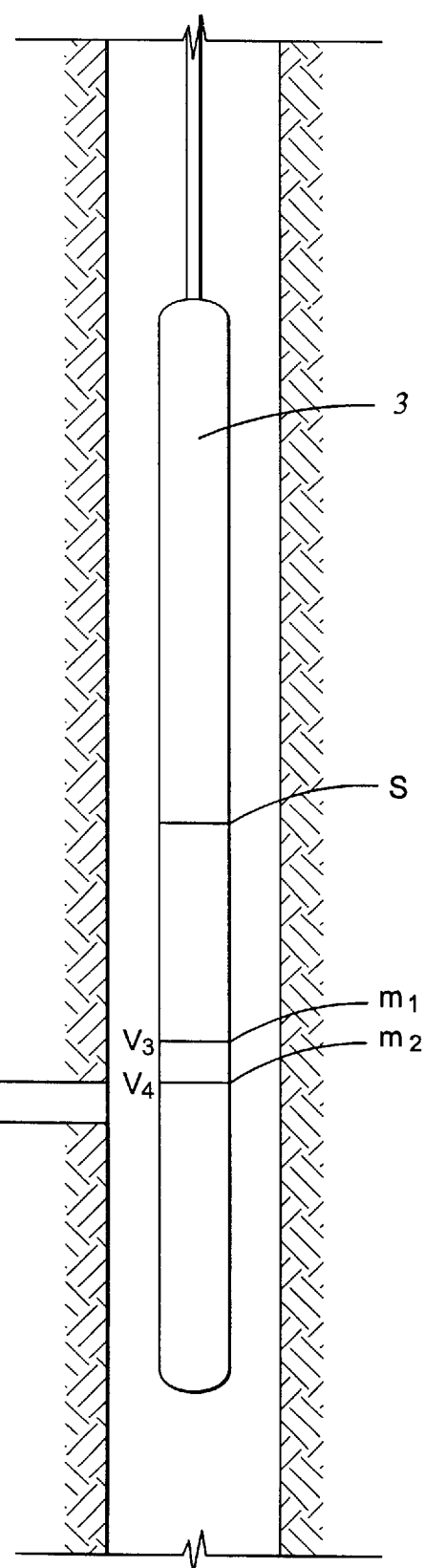
*Fig. 2B*   *Fig. 2C*

METHOD FOR CORRECTING WELL LOG DATA FOR EFFECTS OF CHANGES IN INSTRUMENT VELOCITY (CABLE YO-YO)

CROSS-REFERENCES TO RELATED APPLICATIONS

This application is a continuation-in-part of U.S. patent application Ser. No. 09/193,448 filed on Nov. 17, 1998, U.S. Pat. No. 6,154,704.

BACKGROUND OF THE INVENTION

1. Field of the Invention

This invention is related to methods for correcting well log data for the effects of changes in the velocity of a logging instrument as it moves along a wellbore. The changes in velocity are primarily caused by a phenomenon known in the art as cable "yo-yo". The invention is particularly related to data processing methods for well logging instruments which produce output by combining measurements made at more than one depth within the wellbore.

2. Description of the Related Art

Electric wireline well logging instruments are typically inserted into and withdrawn from wellbores by means of armored electrical cables. The logging instruments generate signals which are related to physical properties of the earth formations through which the wellbore is drilled. A record of the properties of the earth formations with respect to depth in the wellbore is generally made at the earth's surface by pulling the logging instrument out of the wellbore by reeling the cable onto a winch or similar spooling device, while simultaneously recording the signals generated by the logging instrument. The record of the measurements is thus made to correspond to the apparent depth within the wellbore at which the measurements were made by the logging instruments.

Measurement of the apparent depth of the instrument in the wellbore is typically performed with a calibrated wheel placed in frictional contact with the cable at the earth's surface. The calibrated wheel turns correspondingly with the amount of linear motion of the cable as the cable is moved into or out of the wellbore by the winch. The wheel can be rotationally coupled to a mechanical counter calibrated to indicate the length of cable moved past the wheel, or the wheel can be coupled to an electronic encoder connected to a computer or electronic counter to indicate and record the length of cable which has moved past the wheel. It is assumed that the length of cable extended past the wheel directly corresponds to depth of the instrument in the wellbore.

Calibrated wheels can accurately determine the total length of cable which has been spooled past the wheel into the wellbore, but the true depth of the instrument in the wellbore may not correspond exactly to the spooled length of cable because the cable is subject to change in its overall length as the tension on the cable varies. The tension on the cable is affected by things such as the total weight of the cable disposed within the wellbore, which can be as much as 500 pounds for each 1000 feet of cable. Tension is also affected by the weight of the instrument when it is inserted into the wellbore, which weight can vary depending on instrument density (related to the weight of the instrument and how much of the instrument volume is enclosed air space) and the density of a fluid ("drilling mud" or "completion fluid") which may fill the wellbore, and can also be affected by friction caused by movement of the instrument against the wall of the wellbore.

Friction is the least predictable of the causes of tension on the cable as it is moved into and out of the wellbore because the wall surface of the wellbore has an indeterminate degree of roughness and the earth formations penetrated by the wellbore have indeterminate frictional coefficients. The fluid which typically fills the wellbore can have indeterminate viscosity and lubricating properties at different depths within a particular wellbore, making determination of friction even more difficult.

It is frequently the case that the measurements made by the instrument can have been made at depths as much as ten feet or more different from the depth caused to be indicated by the calibrated wheel because of tension induced stretch in the cable. Various methods have been developed to correct the apparent depth measurements for changes in the stretch of the cable as caused by the previously described factors. U.S. Pat. No. 3,490,149 issued to Bowers, for example, describes using measurements made by accelerometers disposed in the logging instrument to calculate a change in axial position of the logging instrument, so that the cable length measurements made at the earth's surface can be corrected by using the calculated change in instrument position. U.S. Pat. No. 4,545,242 issued to Chan describes a more sophisticated method for using accelerometer measurements to determine a "correct" instrument position. U.S. Pat. No. 5,541,587 issued to Priest describes a method for determining correct depth of a well logging instrument using a combination of accelerometer measurements and a measurement of phase shift in an electrical signal passed through the logging cable, where the phase shift corresponds directly to the overall length of the logging cable. The phase shift measurement thus corresponds to the amount of stretch in the cable, this measurement being used to calculate instrument position where the accelerometer measurements are least effective and most erroneous, namely when the acceleration on the instrument is zero.

The effectiveness of the prior art methods for correcting cable length measurements to reflect correct depth, however, depends on the fact that most prior art logging instruments provide a calculated output representative of a selected formation property for each depth (axial) position in the wellbore using only measurements acquired by the instrument at that same axial position. At the earth's surface, a record of instrument signals is made with respect to depth, as previously explained. For the typical well logging instrument known in the art, a calculated output is generated at each of the recorded depth levels by processing measurements made by the instrument only at that same depth. While it may be undesirable to have small residual errors in the depth measurement, particularly for instruments which make very finely detailed (in the axial direction) measurements such as the "imaging" instrument described in the Chan '242 patent, for example, typically any small-scale residual errors in the depth measurement do not adversely affect the accuracy of the measurement made by logging instruments which are used to generate calculated output only at depths corresponding to the recording depth of the input data. Therefore, even if the absolute depth value corresponding to the measurement made by these logging instruments is somewhat imprecise, the value of the measurements themselves will properly reflect the value of the formation property in the formation which was adjacent to instrument at the moment of data recording.

More recently, certain types of logging instruments have been developed which use measurements made at more than one depth in the wellbore to generate a calculated output corresponding to a property of the earth formation at a single depth in the wellbore. One example of such an instrument is known as a "long-spaced" acoustic logging instrument, shown in FIG. 1A at A. The long-spaced acoustic logging instrument A includes two or more acoustic transmitters T1, T2 at one end of the instrument A, and a pair or an array of acoustic receivers R1, R2 on the other end of the instrument A. Differences in acoustic travel time between one of the transmitters T1 and each of the receivers R1, R2 are recorded when the receivers R1, R2 are adjacent to a formation of interest F. Similarly, differences in acoustic travel time are recorded after the instrument A has moved so that two of the transmitters T1, T2 are adjacent to the formation of interest F, as shown in FIG. 1B. The acoustic travel times are typically measured between one of the receivers R1 at the other end of the instrument and the two transmitters T1, T2. The two sets of travel time measurements, first made with the instrument A positioned as shown in FIG. 1A, and those measured with the instrument A positioned as shown in FIG. 1B, are then averaged to provide a "borehole compensated" measurement of acoustic interval travel time (generally inverted into acoustic velocity) within the formation of interest F. The method of calculating the borehole compensated velocity depends on having the transmitters T1, T2 in FIG. 1B positioned adjacent to exactly the same interval of formation (the formation of interest F) as were the receivers R1, R2 in FIG. 1A in the previous set of measurements. The typical long-spaced acoustic logging instrument has transmitter to receiver spacings such that the instrument is moved about 8 to 12 feet between the two sets of measurements.

Errors in depth measurement between the two sets of measurements can result in significant error in the calculated result where even only very small errors in depth measurement occur.

While the example of the acoustic logging instrument serves to illustrate the mechanics of the problem caused by residual depth measurement error, the residual depth error problem has not generally been found to cause objectionable error in the calculated results from most types of well logging measurements. More recently, however, certain types of well logging instruments have been developed for which even very small residual errors in the depth measurement cause large errors in some of the calculated results. One such instrument is described in a paper by X. Li et al entitled, "High-Definition Lateral Log and its Application to the Study of Formation Resistivity", Paper "N", The Fourth Well Logging Symposium of Japan, Sep. 24–25, 1998. The instrument described in the X. Li et al paper makes measurements of voltage, voltage difference and second difference of voltages between axially spaced apart electrodes along an insulated sonde mandrel. In order to process the measurements into a representation of resistivity (the representation known in the art as "focused" resistivity) of the formations of interest, it is necessary to have various ones of the electrodes positioned adjacent to the exact same formation of interest. Even very small errors in positioning of the instrument have shown to provide unacceptable calculated results. None of the prior art methods for correcting depth measurement have proven adequate to overcome the errors in the calculated results for these logging instruments.

SUMMARY OF THE INVENTION

The invention is a method for correcting data measured by a well logging instrument for the effects of cable yo-yo, The data are first preprocessed to reduce the magnitude of certain spatial frequency components in the data occurring within a bandwidth of axial acceleration of the logging instrument which corresponds to the cable yo-yo. The cable yo-yo bandwidth is determined by spectrally analyzing axial acceleration measurements made by the instrument. After the preprocessing step, eigenvalues of a matrix are shifted, over depth intervals where the smallest absolute value eigenvalue changes sign, by an amount such that the smallest absolute value eigenvalue then does not change sign. The matrix forms part of a system of linear equations which is used to convert the instrument measurements into values of a property of interest of the earth formations. Artifacts which remain in the data after the step of preprocessing are substantially removed by the step of eigenvalue shifting.

In one embodiment, the step of preprocessing includes low-pass filtering using a cutoff at the axial resolution limit of a sensor on the instrument. Low pass filtering is used where the spatial frequency of the yo-yo is above the axial resolution limit of the particular sensor.

In another embodiment, the step of preprocessing includes phase shifting the response of one sensor to that of another sensor on the instrument. Phase shifting is performed within the bandwidth of the yo-yo as determined by the accelerometer measurements.

Still another embodiment of preprocessing include phase synthesis of the data recorded by one sensors on the instrument to match that of another sensor on the instrument. The phase synthesis is also performed within the bandwidth of the yo-yo as determined by the accelerometer measurements.

BRIEF DESCRIPTION OF THE DRAWINGS

FIGS. 1A and 1B shows a long spaced acoustic well logging instrument for making "borehole compensated" acoustic measurements to illustrate the source of the problem solved by this invention.

FIGS. 2B and 2C show an electrical resistivity measuring instrument having electrodes disposed adjacent to a formation of interest, where two different sets of measurements of the same formation of interest are made when the instrument is moved along the wellbore.

DESCRIPTION OF THE PREFERRED EMBODIMENT

Figure 2A:
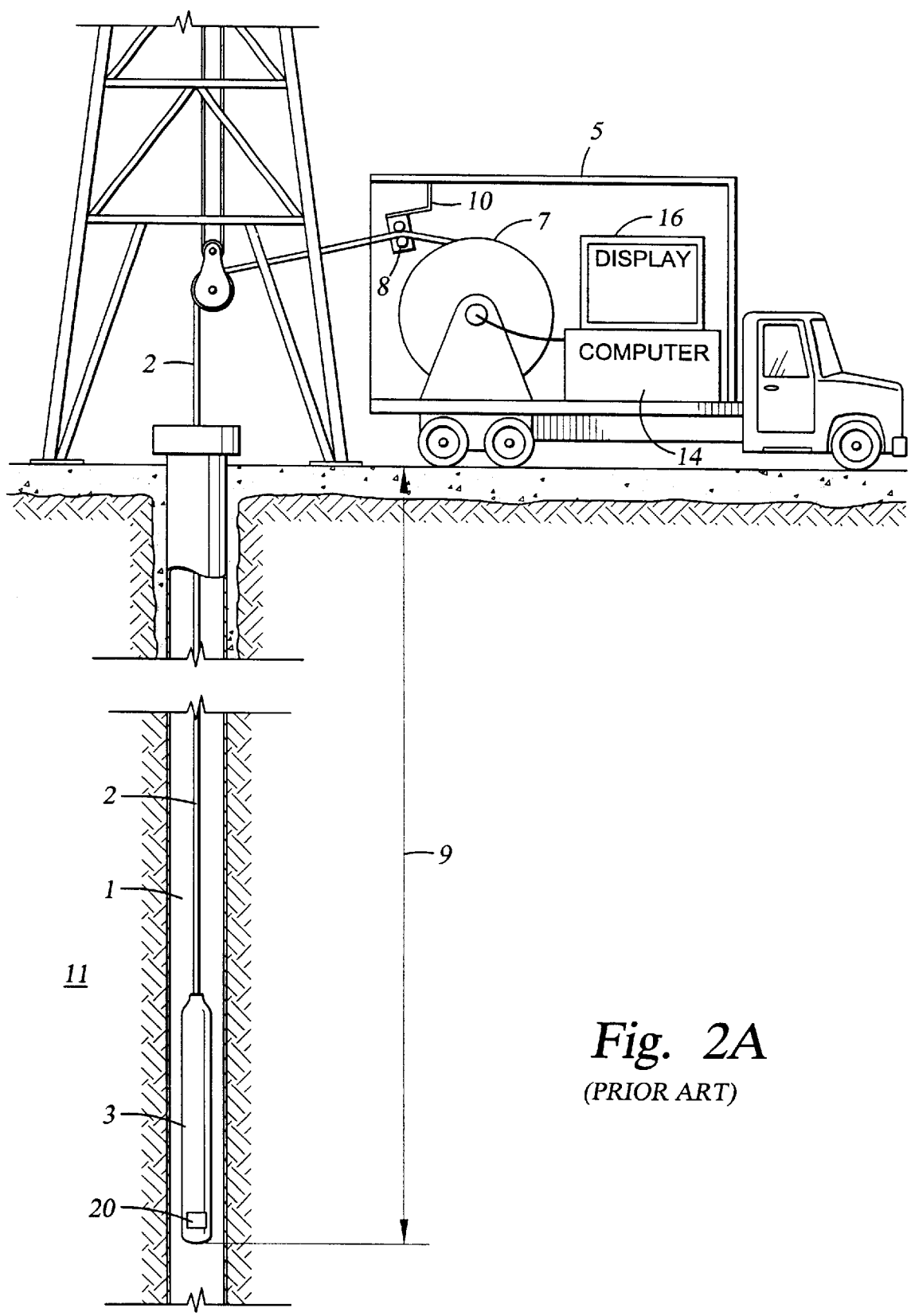
FIG. 2A shows a well logging instrument lowered into a wellbore and prior art systems for measuring the depth of the instrument in the wellbore.

FIG. 2A shows a well logging instrument 3 as it is typically disposed in a wellbore 1 for recording a well log. The instrument 3 is attached to one end of an armored electrical logging cable 2. The cable 2 is extended into and withdrawn from the wellbore 1 using a winch 7 forming part of a surface logging unit 5. As the cable 2 is unspooled from the winch 7, it passes through a measuring head 8 suspended from a spooling arm 10 attached to the logging unit 5. The measuring head 8 can include an encoder (not shown) for measuring the length of cable 2 unspooled from the drum 7 as it passes the measuring head 8. A well log is typically conducted by first unspooling the cable 2 into the wellbore 1 and then respooling the cable 2 onto the drum 7 while causing the instrument 3 to make measurements corresponding to various properties of formations 11 penetrated by the wellbore 1 as the instrument is correspondingly pulled out of the wellbore 1.

The encoder (not shown) on the measuring head 8 is electrically connected to a computer 14 which can include a depth display 16. The length of cable 2 spooled into the wellbore 1 as measured by the measuring head 8 typically corresponds directly to the depth 9 of the instrument 3 in the wellbore 1, unless friction between the instrument 3 and the wellbore 1, or the weight of the instrument 3 and the cable 2 causes the cable 2 to stretch an indeterminate amount as the cable 2 is spooled back onto the winch 7. As the cable 2 is spooled onto the winch 7, the encoder (not shown) on the measuring head 8 instructs the computer 14, as selected incremental lengths of the cable 2 are moved past the measuring head 8, to generate an output record of the signals sent by the instrument 3 along the cable 2. The size of the selected incremental length will depend on the type of sensor (not shown separately) in the logging instrument 3, but will typically be on the order of 0.125 foot (0.0381 m) for most types of well logging instruments, and on the order of 0.01667 foot (0.0508 m) for "imaging" devices such as described in the Chan '242 patent previously referred to in the Background section. Typically, for each sensor (not shown) on the instrument 3, each sensor's output value is recorded each time a depth increment is generated by the computer 14 in response to the encoder (not shown) on the measuring head 8.

As is known in the art, measurements made by various sensors (not shown) on the instrument 3 at any one particular depth in the wellbore 1 may be combined in various ways with measurements made at other depths in the wellbore 1 to generate a calculated result for the particular formation of interest at the particular depth in the wellbore 1. For example, the logging instrument described in the X. Li et al paper referred to earlier includes a single electrical current source electrode (indicated by numeral 1 in FIG. 1 of the X. Li et al paper) and a set of measurement electrodes (indicated by numerals 2 through 9 and letters A through J in FIG. 1 of the X. Li et al paper). Voltages are measured at each electrode and voltage differences are measured between adjacent electrodes, and second differences of voltages from adjacent pairs of electrodes are also measured. Generally, at each depth of the instrument in the wellbore which corresponds to an encoder (not shown) output increment (which as previously explained can be about 0.125 foot [0.0381 m]), the values of the voltages, voltage differences and second differences are recorded with respect to the corresponding depth of the instrument in the wellbore. For some of the calculated outputs using the instrument shown in the X. Li et al reference, measurements made at one depth position are combined in a predetermined manner with measurements made from another depth position, where the measurements correspond to the same formation of interest adjacent to the wellbore.

An example of making voltage measurements corresponding to the same particular earth formation of interest, using measurements made after moving the instrument axially along the wellbore, is shown in FIGS. 2B and 2C. In FIG. 2B, a logging instrument 3 similar in configuration to the one described in the X. Li et al reference is shown where two of its voltage measuring electrodes M1, M2 are positioned adjacent to a formation of interest, F. A current source electrode is shown at S. Voltages are measured, $V_1$ and $V_2$ at each corresponding measuring electrode M1, M2. A voltage difference $V_1-V_2$ can be determined, this difference corresponding to some of the voltage drop which occurs in the formation of interest, F. A voltage drop corresponding to the same formation of interest F but made along a slightly different part of the wellbore can be made by combining voltage measurements made while the instrument 3 is positioned as shown in FIG. 2B with measurements made while the instrument 3 is positioned as shown in FIG. 2C. In FIG. 2B, a voltage is measured $V_2$ which includes effects of all the media (formation and wellbore) outside, or beyond, measuring electrode M2. In FIG. 2C, voltage measurement $V_4$ at electrode M2 again corresponds to all the media (formation and wellbore) outside M2. A difference between the two voltage measurements made at M2, namely $(V_4-V_2)$ would therefore include differential effects across the formation of interest F. A voltage difference $(V_1-V_4)$ would include differential effects of all the media located between the two positions of the source electrode S, these positions shown in FIG. 2B and shown in FIG. 2C. Processing such sets of measurements according to the invention will be further explained.

Referring again to FIG. 2A, the logging instrument 3 also includes an accelerometer 20 which has a sensitive axis generally parallel to the axis of the logging instrument 3. The accelerometer 20 measures the acceleration of the instrument along the axis of the instrument 3 which is generally along the direction of motion of the instrument along the wellbore 1. The accelerometer 20 measurements are processed (which processing may include some form of averaging) and are then transmitted to the computer 14 over the logging cable 2, where as processed are typically recorded at each depth increment just as the measurements from the other sensors (not shown) on the logging instrument 3.

Figure 6:
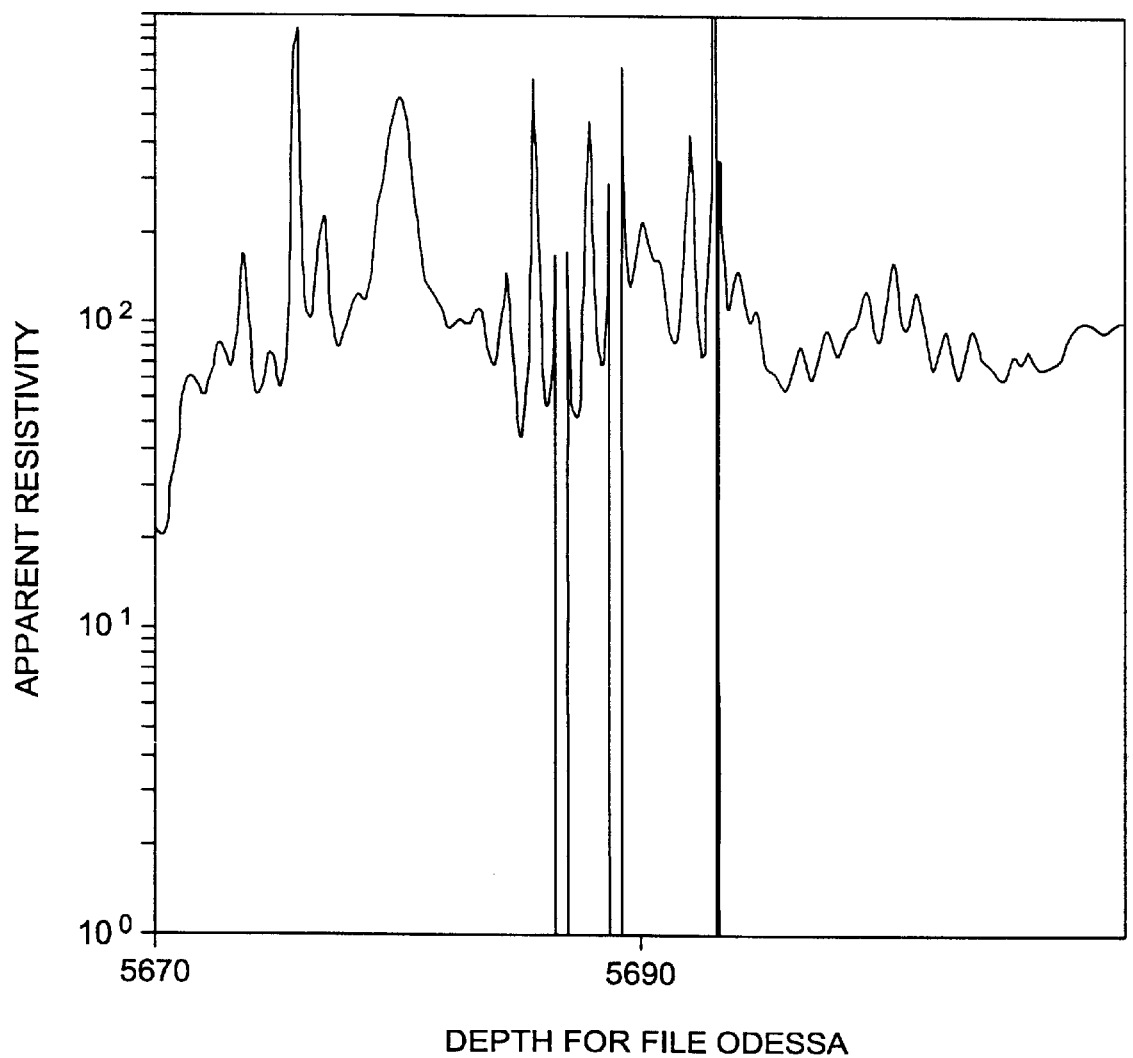
FIG. 6 shows resistivity values computed from data recorded by a multiple electrode resistivity logging instrument where cable yo-yo has affected the computed results.

Having described in general terms the data which are recorded from the logging instrument 3, the method of processing the data according to the invention will now be explained. The recorded data should generally first be preprocessed by one of several methods. The purpose of preprocessing is to identify, and to reduce substantially in magnitude, components of the recorded data which can be attributed to "yo-yo" type motion of the logging instrument. The attribution of these parts of the recorded data to "yo-yo" motion is generally performed by examination of spatial frequency of data from the accelerometer (20 in FIG. 1) to identify the spatial frequency range of the "yo-yo" motion. The various forms of the preprocessing steps which will be described below are intended to substantially reduce error in the data after identification of those portions of the recorded data which are likely to be affected by the yo-yo. An example of a well log produced using an instrument such as described in the X. Li et al reference which is affected by yo-yo, and is not processed according to this invention, is shown in FIG. 6.

Figure 3:
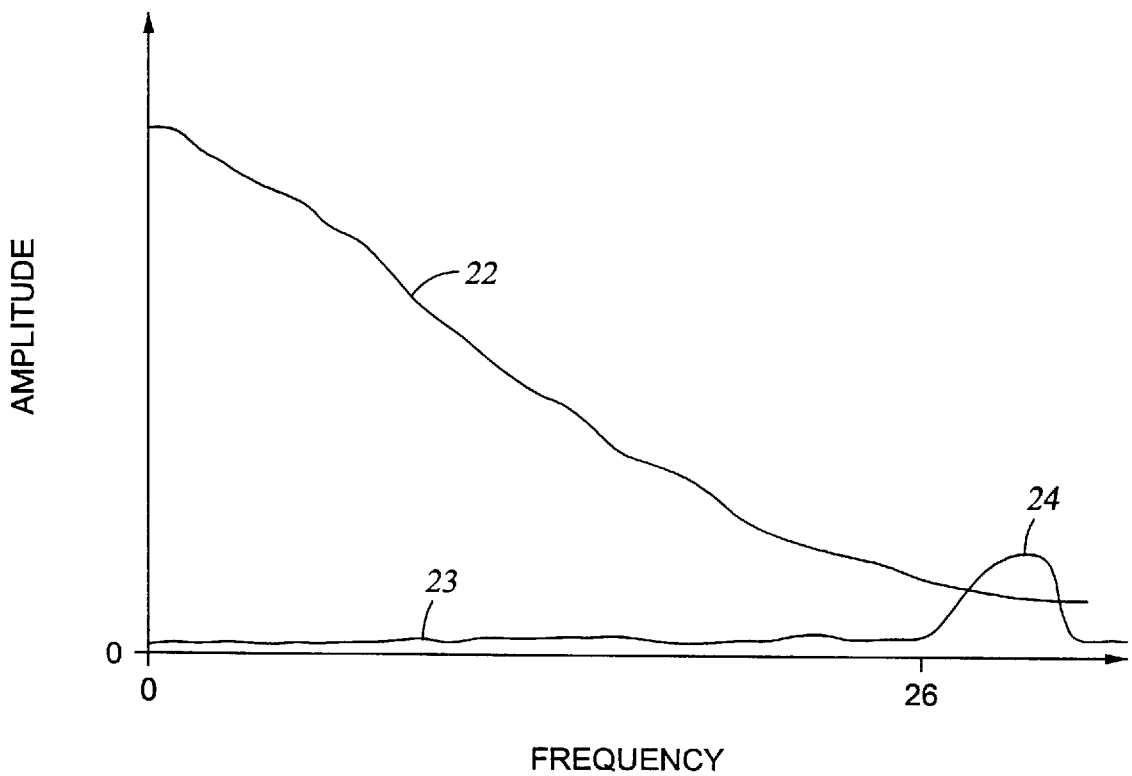
FIG. 3 shows representative Fourier transform magnitudes of signals recorded by one of the sensors on the instrument in FIG. 1, as well as Fourier transform magnitudes of accelerometer signals recorded from the logging instrument.

As a matter of convenience in processing, the recorded data may be segregated into "windows" of about 200 feet in depth range, or any other increment which is convenient for the system operator. For each such window over the total depth interval of data desired to be processed (comprising a plurality of such windows), the data from each sensor (or differences between pairs of sensors as previously explained) are transformed to the spatial frequency domain by Fourier transform. Representative data after Fourier transformation are shown in FIG. 3. A curve 22 representing relative magnitudes of each spatial frequency can have characteristics as shown in FIG. 3. The signals from the accelerometer (20 in FIG. 2A) should also be transformed into the spatial frequency domain over each of the same windows. The transformed accelerometer data are shown in FIG. 3 as curve 23. A relatively narrow-band peak, shown generally at 24, is usually present in the spectrally analyzed accelerometer data. The peak 24 results from a type of motion of the logging instrument previously referred to herein and known in the art as cable "yo-yo". Generally speaking, yo-yo is caused by frictional force on the logging instrument causing it to decelerate with respect to the upward speed of the cable as it is being spooled onto the winch (7 in FIG. 2A). As the friction is overcome or otherwise relieved, the instrument can "snap loose" and can be accelerated upward by the excess tension on the cable (2 in FIG. 2A). The excess tension results from the combination of the frictional force with the weight of the instrument. The excess tension "stretches" the cable past the amount of stretch which would obtain in the absence of the frictional force. As the instrument accelerates upward its momentum can cause it to move past the position at which the cable would be stretched only by the weight of the instrument, "shrinking" the cable to a length less than the "normal" stretched length. The "shrinking" will reduce the tension on the cable to a value below that which would occur if the instrument had not accelerated upward (the "normal" tension on the cable from the instrument weight), thus allowing the instrument to decelerate in the upward direction. The overall motion can be described as equivalent to suspending the instrument from one end of a spring which is being pulled upwards at its other end.

The center frequency of the accelerometer data peak 24 will depend generally on the depth in the wellbore of the instrument, since the elastic ("spring") constant of the logging cable (2 in FIG. 2A) will depend on the length of cable (2 in FIG. 2A) extended into the wellbore. Generally speaking, the peak 24 will decrease in center frequency as the instrument depth increases. It is frequently the case that the peak 24 will have a center frequency which is greater than the spatial (axial) resolution limit, shown generally at 26, of a particular sensor for which the data are being analyzed. As is understood by those skilled in the art, the axial resolution for the measurements made by any particular sensor on an instrument such as described in the X. Li et al paper will be related to the axial spacing of the particular sensor (measuring electrodes) from the current source electrode.

Figure 7:
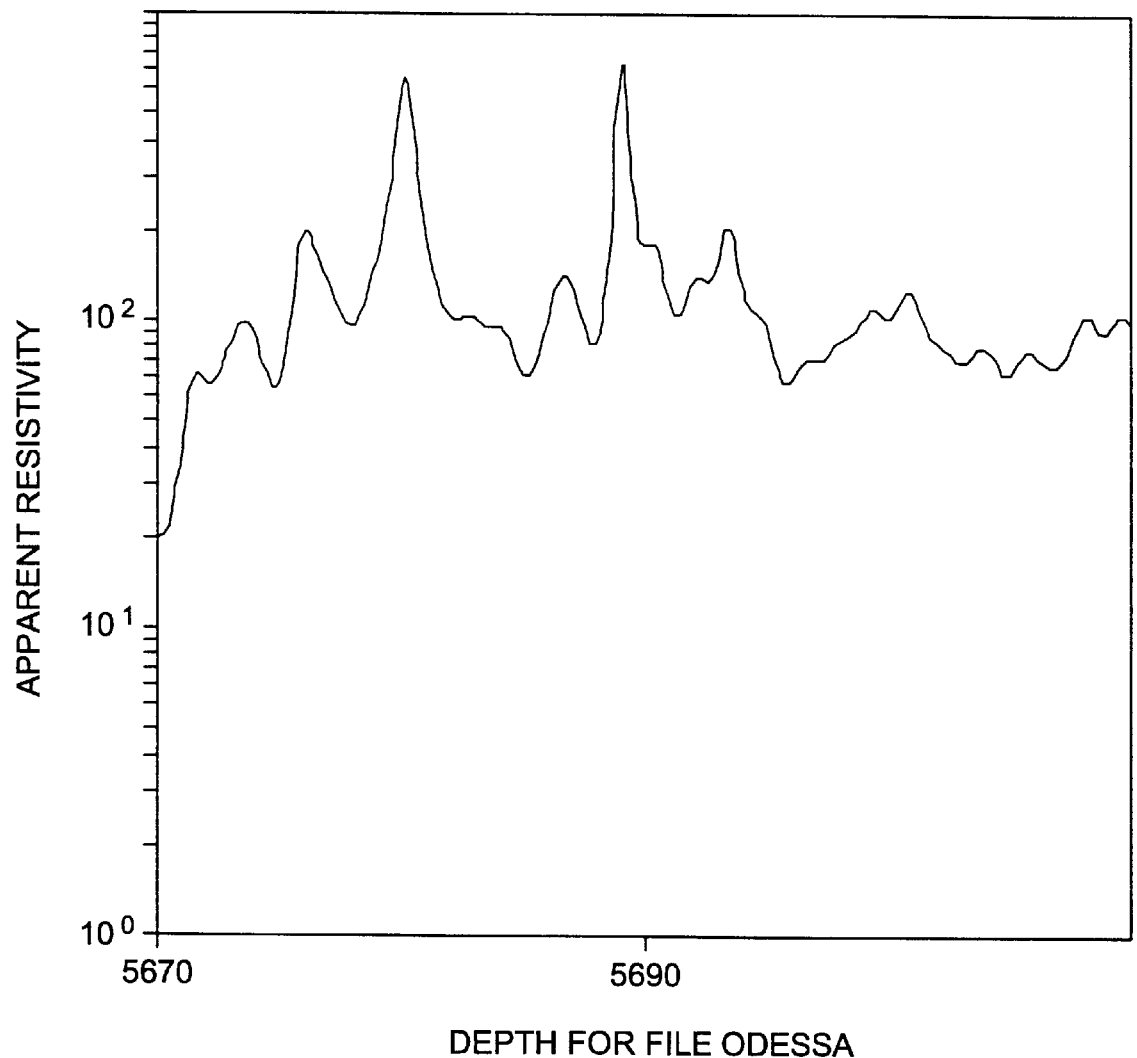
FIG. 7 shows the data from FIG. 6 after low-pass filtering.

If it is determined that the peak 24 has a center frequency above the resolution limit 26, then the effects of yo-yo on the data as recorded can be substantially removed by low-pass filtering, using, for example a cosine tapered filter having a cutoff frequency at about the axial resolution limit 26. The type of filter actually selected is a matter of convenience for the system designer and is not meant to limit the invention. An example of well log data after low pass filtering is shown in FIG. 7, which is a low-pass filtered data set from the data shown in FIG. 6.

Generally, the accelerometer data should be analyzed to determine whether the peak 24 is above the resolution limit for the sensor on the logging instrument having the shortest (highest) axial resolution. If this is the case, the data from each such sensor can be low-pass filtered as previously described by using a low-pass filter have the appropriate cutoff frequency. After low pass filtering, the data can be inverse Fourier transformed to the space domain for calculating results as is normally done for the particular logging instrument. It should be noted that logging instruments having sensor arrays such as described in the X. Li et al reference can have an axial resolution which is selectable by the system operator. For example, measurements from the longer axially spaced measuring electrodes can be used to calculate formation resistivity at greater radial depth in the formation, while having reduced (longer) axial resolution. In this case, the axial resolution limit of the shortest axial spacing measuring electrode actually used to calculate resistivity can be that used to select the cutoff frequency for the step of low pass filtering.

If instead the peak 24 occurs below the axial resolution limit of the particular sensor for which the overall measurement resolution is selected, then low pass filtering would affect the quality of the data upon inverse transformation back to the space (depth) domain. In these cases, alternative forms of preprocessing are preferred. One such alternative method of preprocessing is phase shifting (or phase matching). For example, if one type of calculated result requires using differences in the measured values between two sensors on the logging instrument (3 in FIG. 2A), after the instrument has moved a predetermined distance, then the fact that these sensors have a fixed axial distance between them can be taken into account to apply phase shifting to minimize the effects of yo-yo on the difference measurements.

Figure 4:
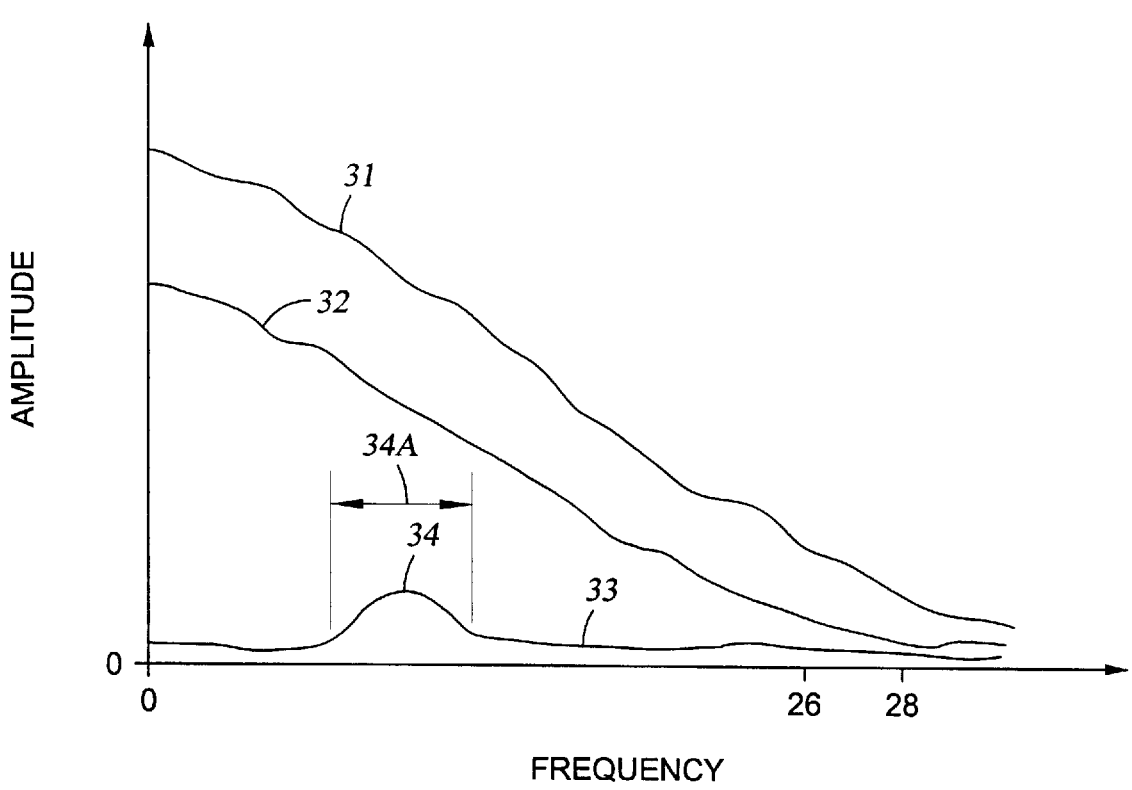
FIG. 4 shows Fourier transform magnitudes of signals recorded by two adjacent sensors on the instrument of FIG. 1, as well as Fourier transform magnitudes of accelerometer signals recorded from the logging instrument.

Referring to FIG. 4, the data from the two sensors of interest in a particular window are Fourier transformed into the spatial frequency domain. The transformed data magnitudes are shown at curves 31 and 32, with corresponding axial resolution limits shown at 26 and 28. In FIG. 4, the transformed accelerometer data magnitudes are shown at curve 33 and exhibit a peak at 34. The peak 34 has a bandwidth shown at 34A.

Figure 8:
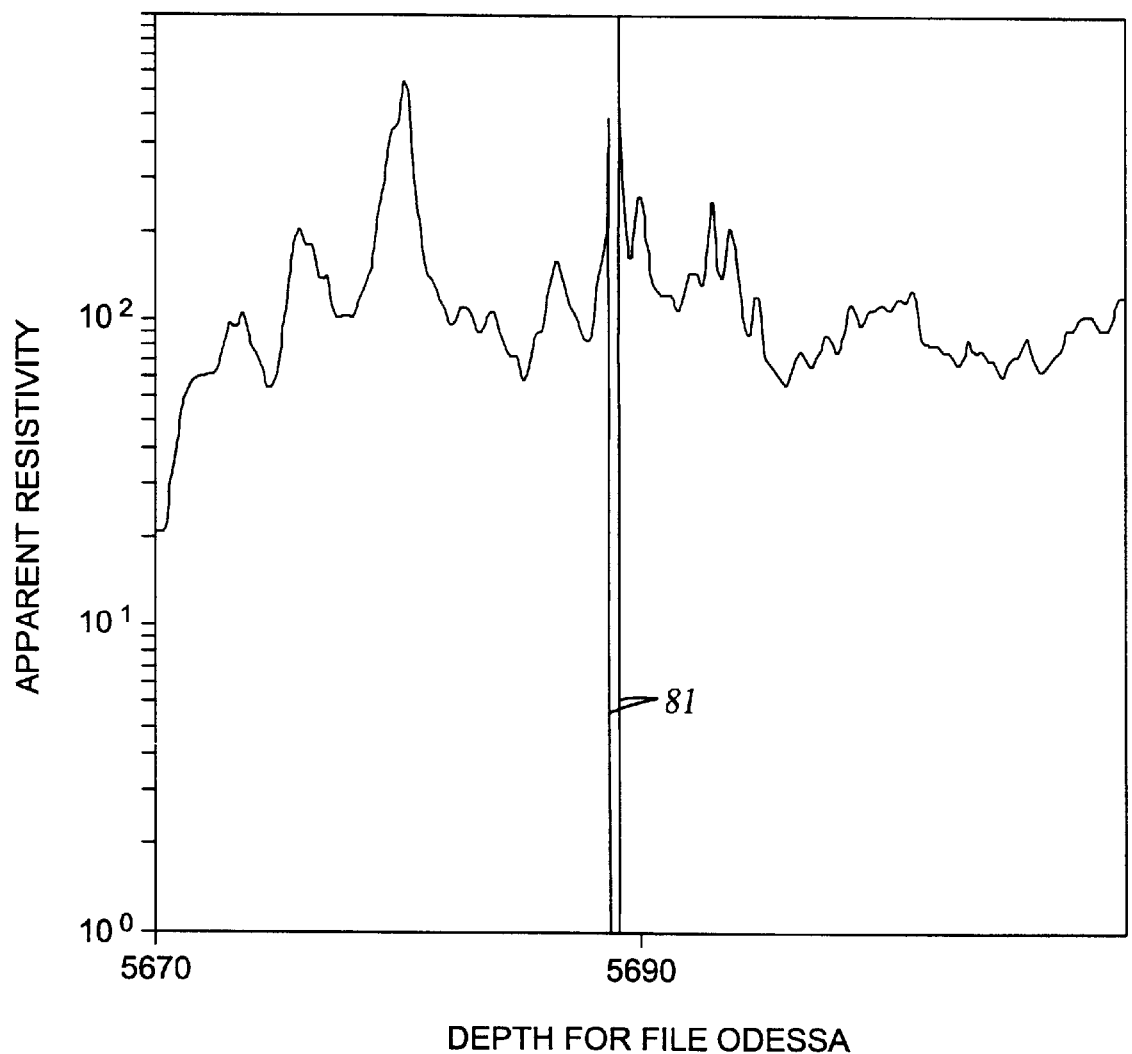
FIG. 8 shows the data from FIG. 6 after phase shifting.

In preprocessing by phase shifting, it is assumed that any differences in the spectra within the bandwidth of the accelerometer peak 34 between the two transformed data sets 31, 32 will be substantially affected by the cable yo-yo, because the axial distance between the sensor themselves is fixed by the configuration of the logging instrument (3 in FIG. 2A). Therefore, the phase of the data from either one of the sensors (shown as amplitude curves 31 and 32) can be matched to the phase of the data from the other sensor within the bandwidth 34A of the peak 34 on the accelerometer data 33. After phase shifting, the data can be inverse Fourier transformed to the space domain for processing as is conventional for the particular well logging instrument. An example of phase shifting of the data is shown in FIG. 8, which represents the same well log section as shown in FIG. 6 but with application of the phase shifting just described. A "spike" on the processed log, shown at 81, corresponds to a change in sign of one of the eigenvalues of a matrix in a system of linear equations used to convert the instrument measurements to values of the formation property of interest. Adjustments to the eigenvalues which are useful in removing the spike 81 will be explained later.

Figure 5:
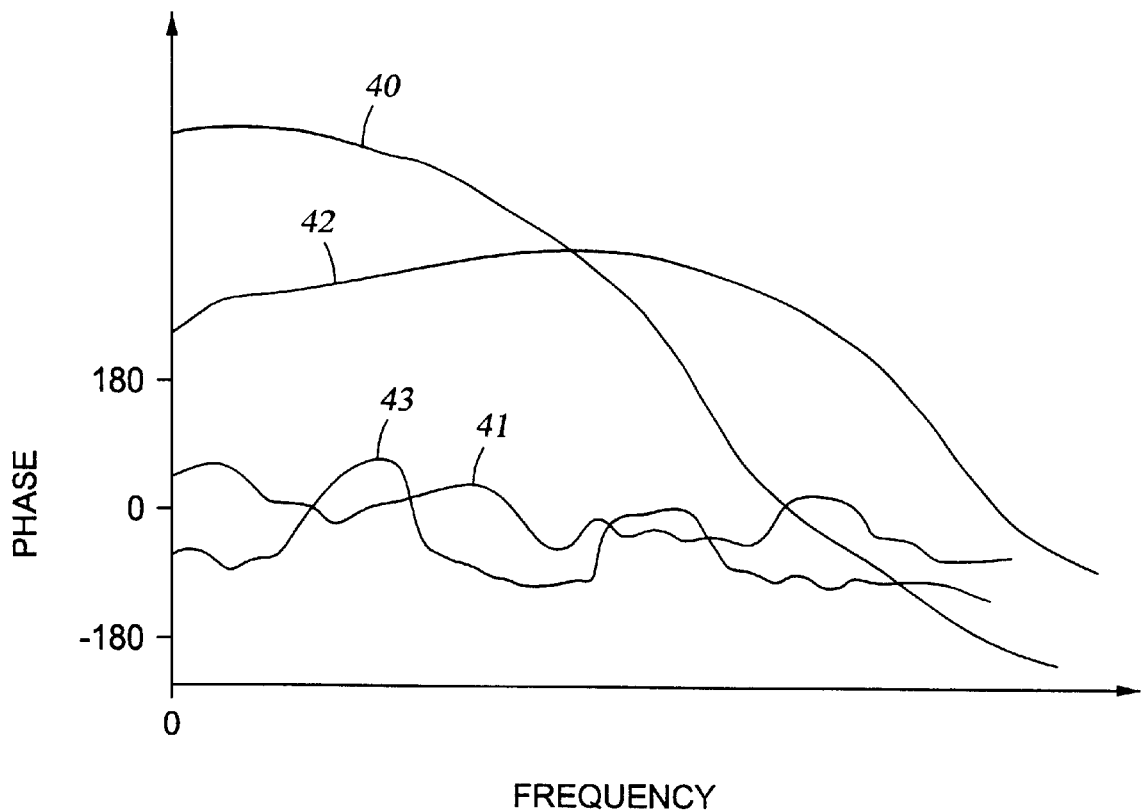
FIG. 5 shows Fourier transform magnitudes of signals recorded as the difference between signals recorded by one sensor at two different axial positions in the wellbore made by the instrument of FIG. 1, as well as Fourier transform magnitudes of accelerometer signals recorded from the logging instrument.
Figure 9:
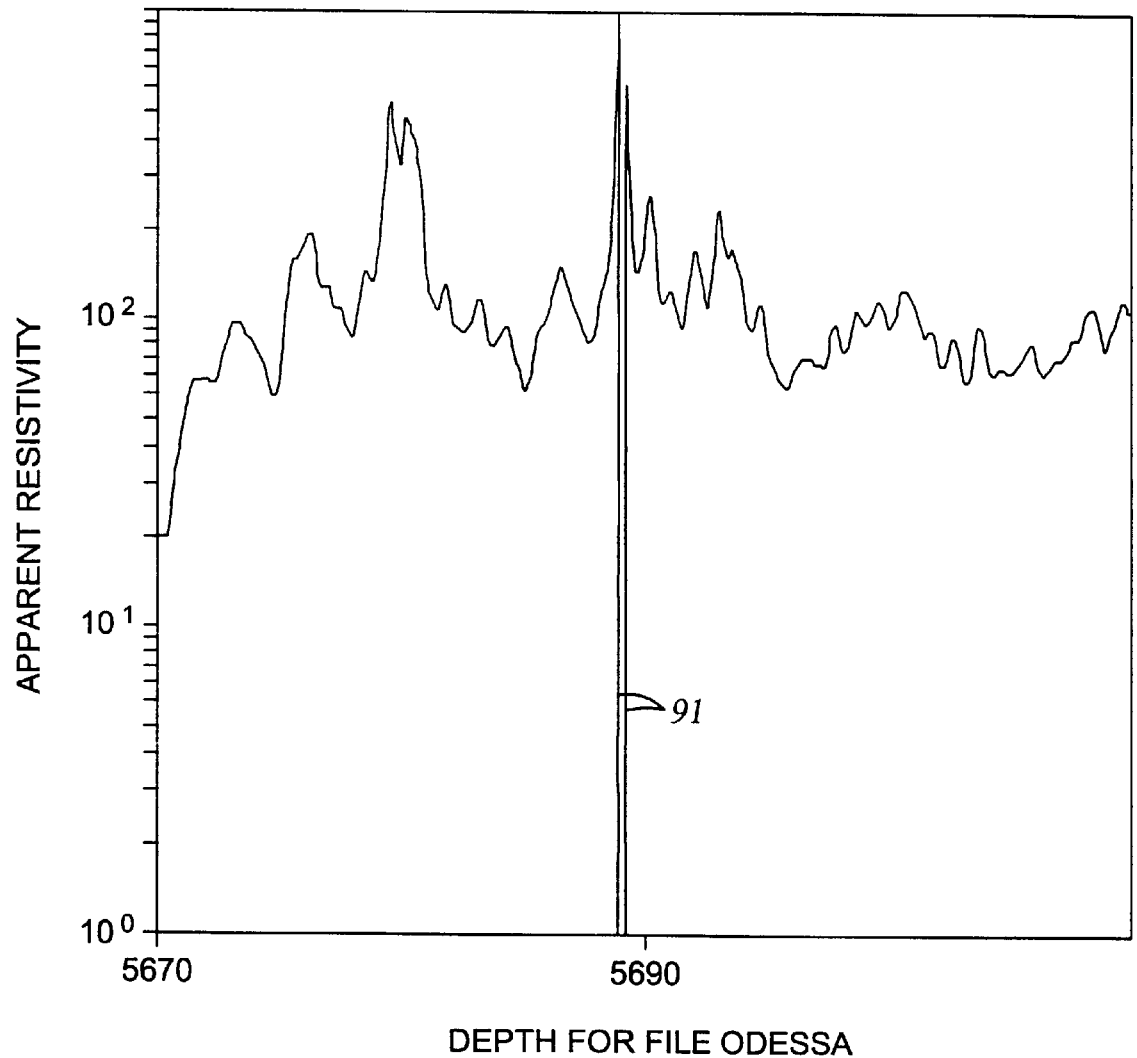
FIG. 9 shows the data from FIG. 6 after phase synthesis.

An alternative to phase shifting can be also be used for preprocessing when the accelerometer data "yo-yo" peak (34 in FIG. 4) is below the axial resolution limit of the sensor of interest. This alternative preprocessing is known as phase synthesis. For the well logging instrument described in the X. Li et al paper, for example, some calculated results are generated by combining voltage difference measurements, rather than direct voltage measurements, between adjacent measuring electrodes with calculated voltage differences made as the instrument is axially moved so that the source electrode "brackets" the formation interval of interest. Phase synthesis may be appropriate in these cases because the number of measurements to process can be reduced when voltage differences are used. Phase synthesis is performed by Fourier transforming, within each window, the voltage difference measurements made between the fixed electrodes, and Fourier transforming the voltage difference measurements made between the different depth positions which correspond to the same formation of interest as the fixed electrode measurements ("multiple depth data"). The Fourier transformed data for each set of measurements will include amplitude at each spatial frequency and phase at each spatial frequency. This is shown in FIG. 5 for the fixed electrode data as magnitude curve 40 and phase curve 41, and for the multiple depth data as magnitude curve 42 and phase curve 43. The values represented by the curve 40 from the fixed electrode data can then be substituted for the values represented by curve 42 from the multiple depth data. The substituted magnitudes and phases from the multiple depth data can then be inverse Fourier transformed to the space domain. After inverse Fourier transforming, any imaginary part of the converted data set can be excluded, as well as excluding any values which are outside a preselected upper and lower threshold. These steps result in a modified multiple depth data set. The modified multiple depth data set excluding imaginary and outside threshold data values can then be Fourier transformed into the spatial frequency domain. Once again, the magnitude values from the fixed electrode data can be substituted for the magnitude values in the Fourier transformed, modified multiple depth data set. Once again an inverse Fourier transform can be performed. The result of the inverse Fourier transform can be compared to the result of the previous inverse Fourier transform. If the differences between the results of successive inverse Fourier transforms is negligible, or if a selected number of iterations has been performed, approximately 10, then the process can be halted. The result of the final iteration after inverse Fourier transformation is a final modified multiple depth data set which can be used to calculate a result as is conventional for the particular well logging instrument. An example of preprocessing by phase synthesis is shown in FIG. 9. FIG. 9 exhibits a spike, shown at 91 which has been associated with the same matrix eigenvalue phenomenon as the spike (81) shown in FIG. 8, and the procedure for removing such spikes will be explained below.

Even after preprocessing, when the data are used to generate the calculated results as for the particular logging instrument, certain artifacts (in particular the spikes as shown in FIGS. 8 and 9) may remain which do not represent valid measurements of properties of the earth formation. The next step in the process of this invention is intended to remove these artifacts.

The instrument described in the X. Li et al paper, for example, uses sets of voltage, voltage difference and second difference measurements, combined in a predetermined manner to generate values of formation resistivity at each recorded depth for which data are measured by the logging instrument. Typically the preselected manner of combination is linear. For the instrument described in the X. Li et al paper a set of electric current magnitudes, represented as vector c, can be calculated from a vector of the measurements (data), b, as related by the following system of linear equations:

$$Ac=b \qquad (1)$$

where matrix A represents a linear operator which maps vector c onto vector b. For the example of a focused resistivity logging tool, the vector c consists of normalized electrical currents and the vector b consists of potential measurements. The Vector c current magnitudes can be used to determine the apparent resistivity of the earth formations.

It has been determined that erroneous values in the calculated results after preprocessing are generally associated with a change in sign of the determinant of matrix A. A method has been devised to remove the erroneous values without adversely affecting the rest of the calculated results. For each depth increment in an interval of interest in the well log, the matrix A is determined using data preprocessed as described earlier. Eigenvalues of the matrix are then determined. The eigenvalues will typically include one or more groups which have generally large absolute values, and one group which has relatively small absolute values and may change sign at certain depth positions. Because the determinant of the matrix A is a product of the eigenvalues, changes in the sign of the determinant (which as explained are associated with incorrect calculated results) can be avoided by shifting the smaller absolute eigenvalue by an amount which causes the smaller absolute eigenvalue not to change sign at the same depth positions.

Shifting the eigenvalues can be performed by the following steps. First, the eigenvalues and associated eigenvectors should be determined for matrix A, where Z represents the matrix of eigenvectors of A, and $\Lambda$ represents a diagonal matrix having eigenvalues on the diagonal:

$$AZ=Z\Lambda : A=Z\Lambda Z^{-1} \qquad (2)$$

therefore equation (1) may be rewritten as $$Z\Lambda Z^{-1}c=b \qquad (3)$$

Then singular value decomposition of Z can be performed as $$Z=U\Sigma V^T \qquad (4)$$

where U and $V^T$ are left and right matrices of singular vectors and $\Sigma$ is a diagonal matrix of singular values. Making this substitution and adjusting the eigenvalues $$c=Z(\Lambda+I\delta)^{-1}V\Sigma^{-1} U^T b \qquad (5)$$

where $V\Sigma^{-1}U^T$ represents the inverse of Z, I is the identity matrix, and $\delta$ represents the shift applied to the eigenvalues. The shift $\delta$ can be calculated for those intervals where the smaller absolute eigenvalue changes sign. Equation (5) imposes physically meaningful constraints on the results calculated by equation (1) by changing diagonal elements in matrix A by δ. This operation changes only the magnitudes and not the directions of the eigenvectors. Changing individual elements of the eigenvectors in a physically meaningful way would also change the directions of the eigenvectors.

The eigenvalues can be determined for matrix A in this way at each depth level over the well log interval desired to be processed. The one of the eigenvalues having the smallest overall absolute value can then be shifted in the depth positions where its sign changes. The shift can be done several ways. One way would be to truncate the eigenvalues by substituting zero or some nominal non-zero value having an appropriate sign, over any depth interval in which the smallest absolute eigenvalue changes sign. Another way to adjust the eigenvalues would be to treat the smallest absolute eigenvalues with respect to depth position as a signal and determine a threshold related to the amount of noise in the recorded or in the preprocessed data. The threshold would represent the smallest absolute value which the eigenvalues would be allowed to reach. Over depth intervals in which the eigenvalue changes sign, the eigenvalue can be shifted to provide for a localized value which just reaches the threshold in the center of any one of such depth intervals, with the endpoints of any one of these depth intervals being selected where the eigenvalue exceeds the threshold by a preselected amount.

Figure 8A:
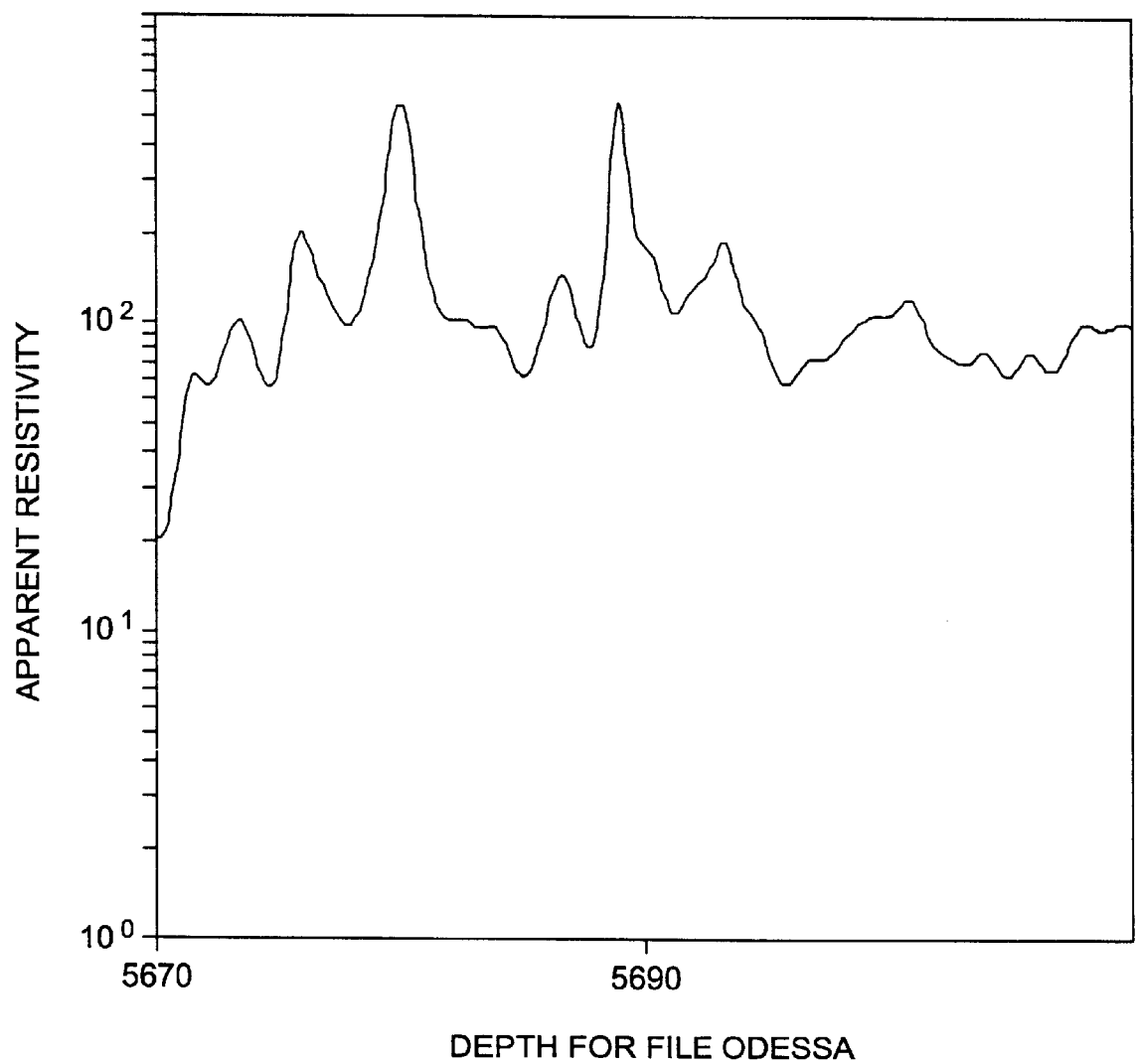
FIG. 8A shows the data from FIG. 6 after phase shifting and eigenvalue shifting (final results).
Figure 9A:
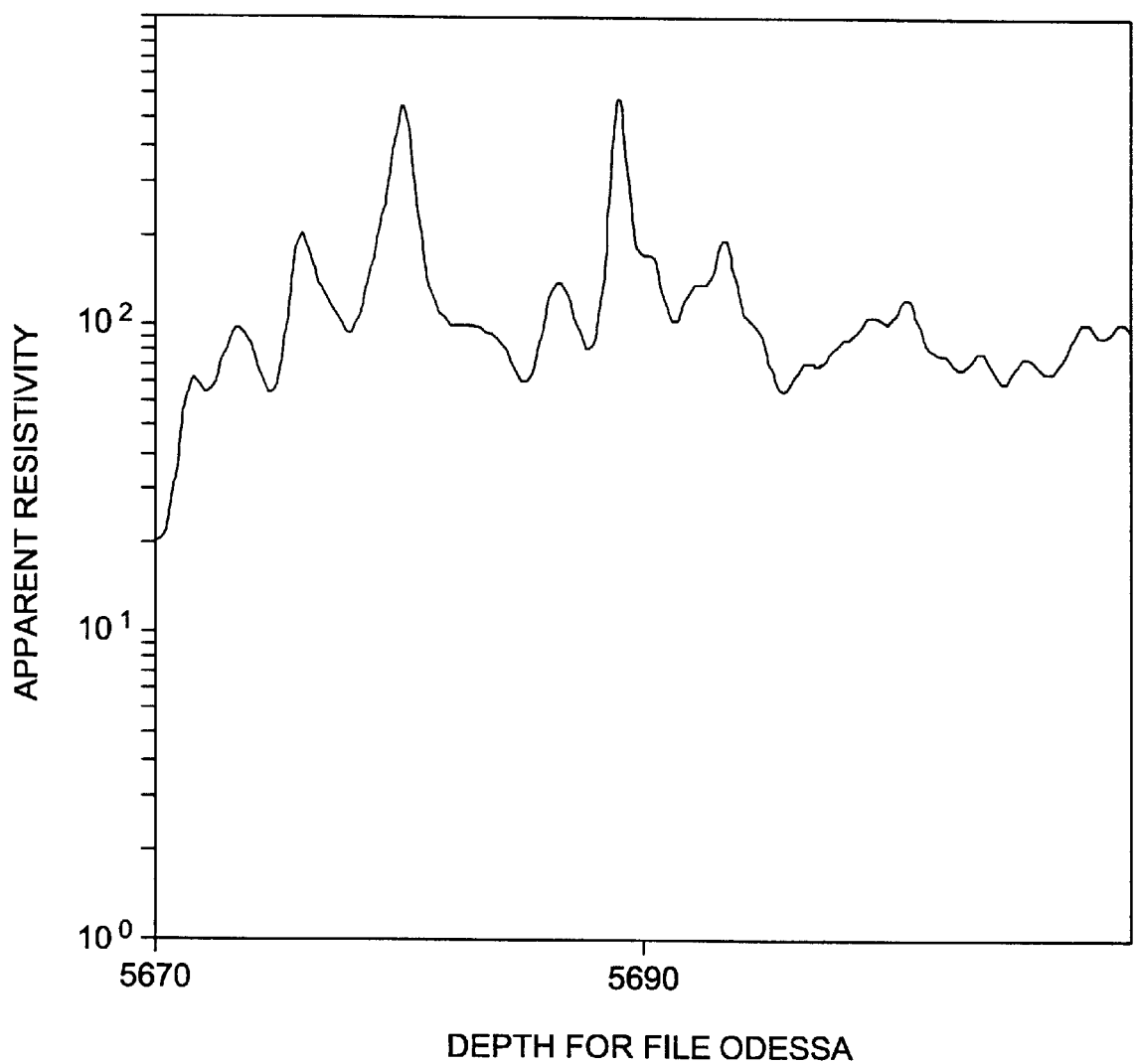
FIG. 9A shows the data from FIG. 6 after phase synthesis and eigenvalue shifting (final results).
Figure 10:
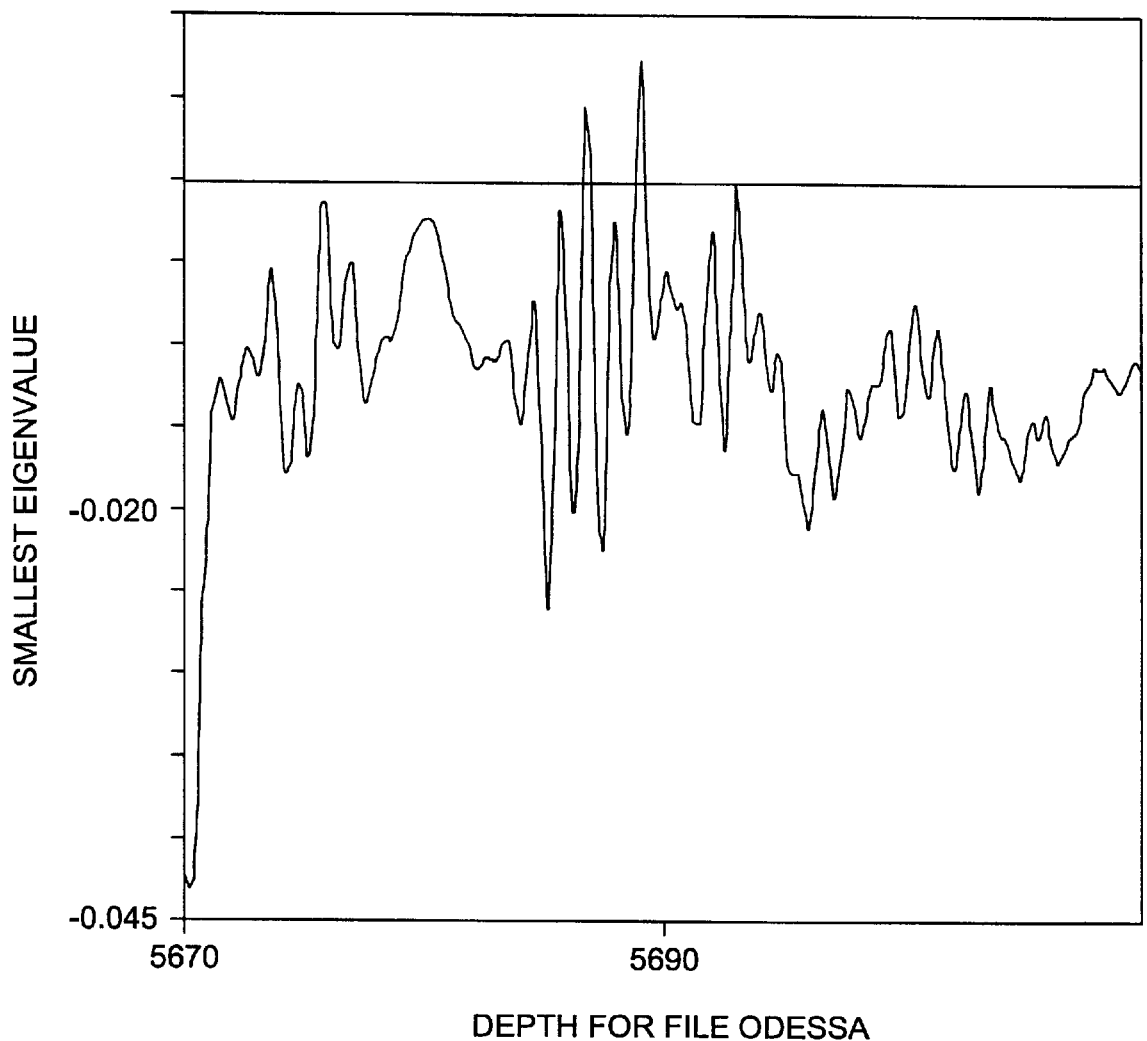
FIGS. 10–13A show eigenvalues of a solution matrix used to calculate the resistivity values shown correspondingly in FIGS. 6–9.
Figure 11:
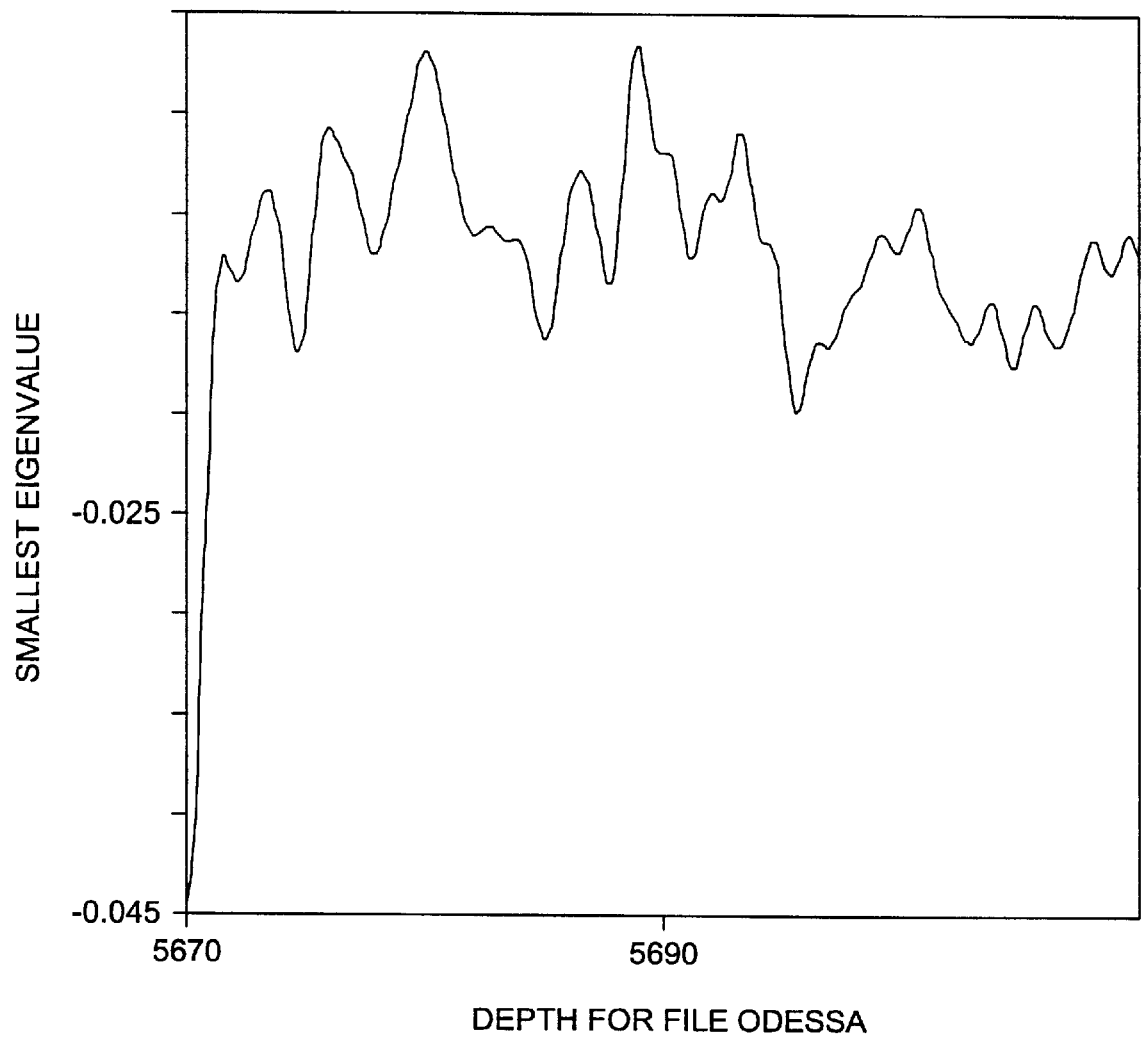
Figure 12:
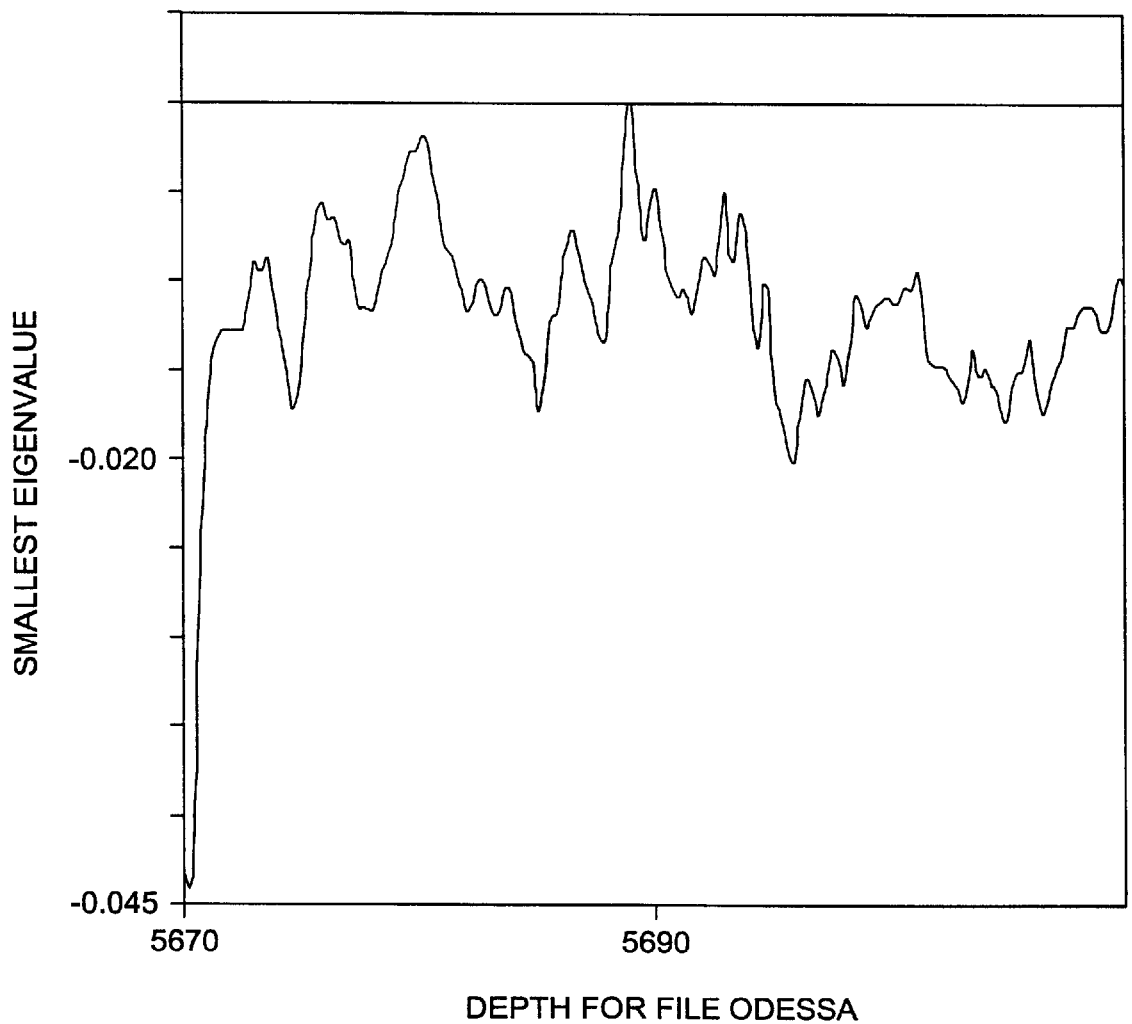
Figure 12A:
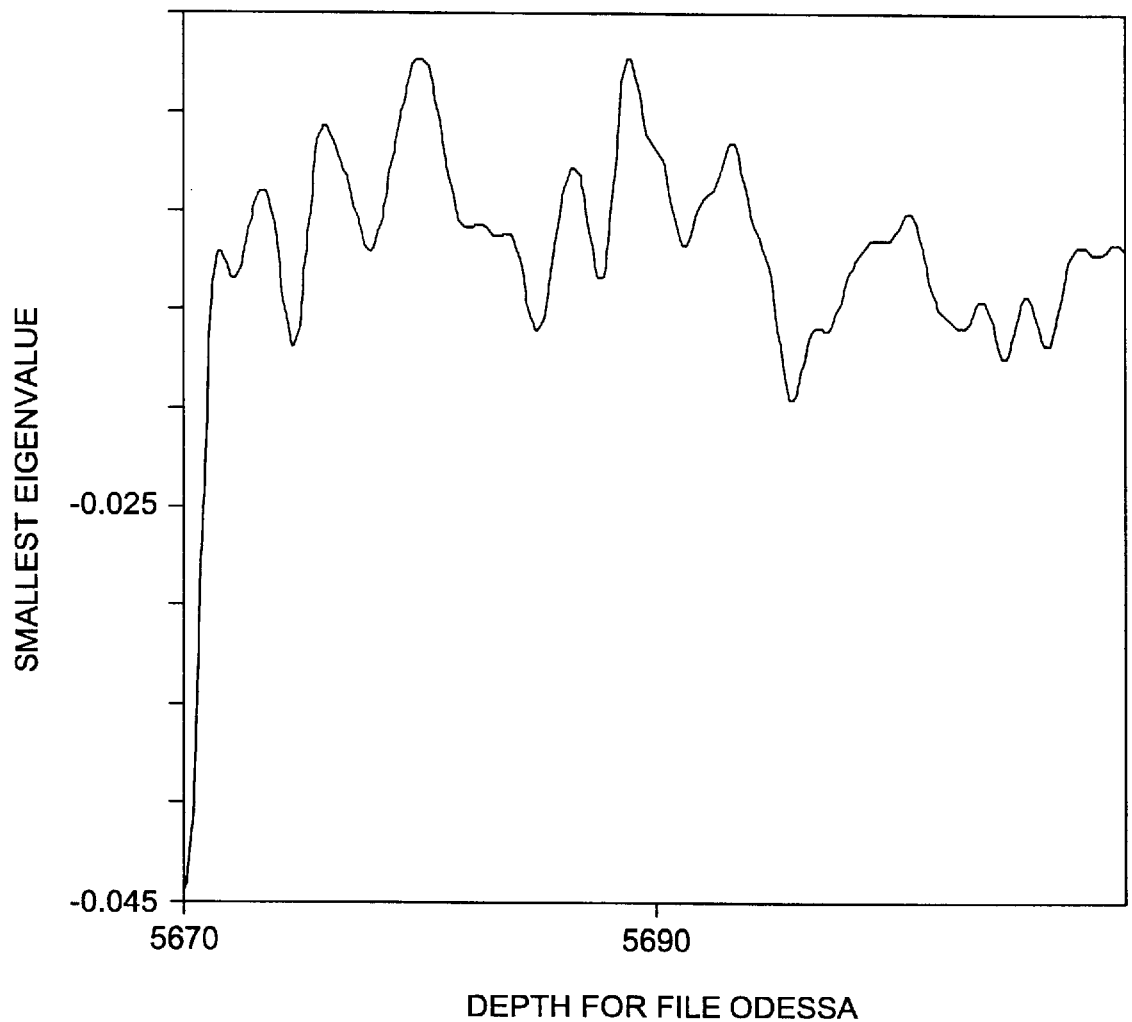
Figure 13:
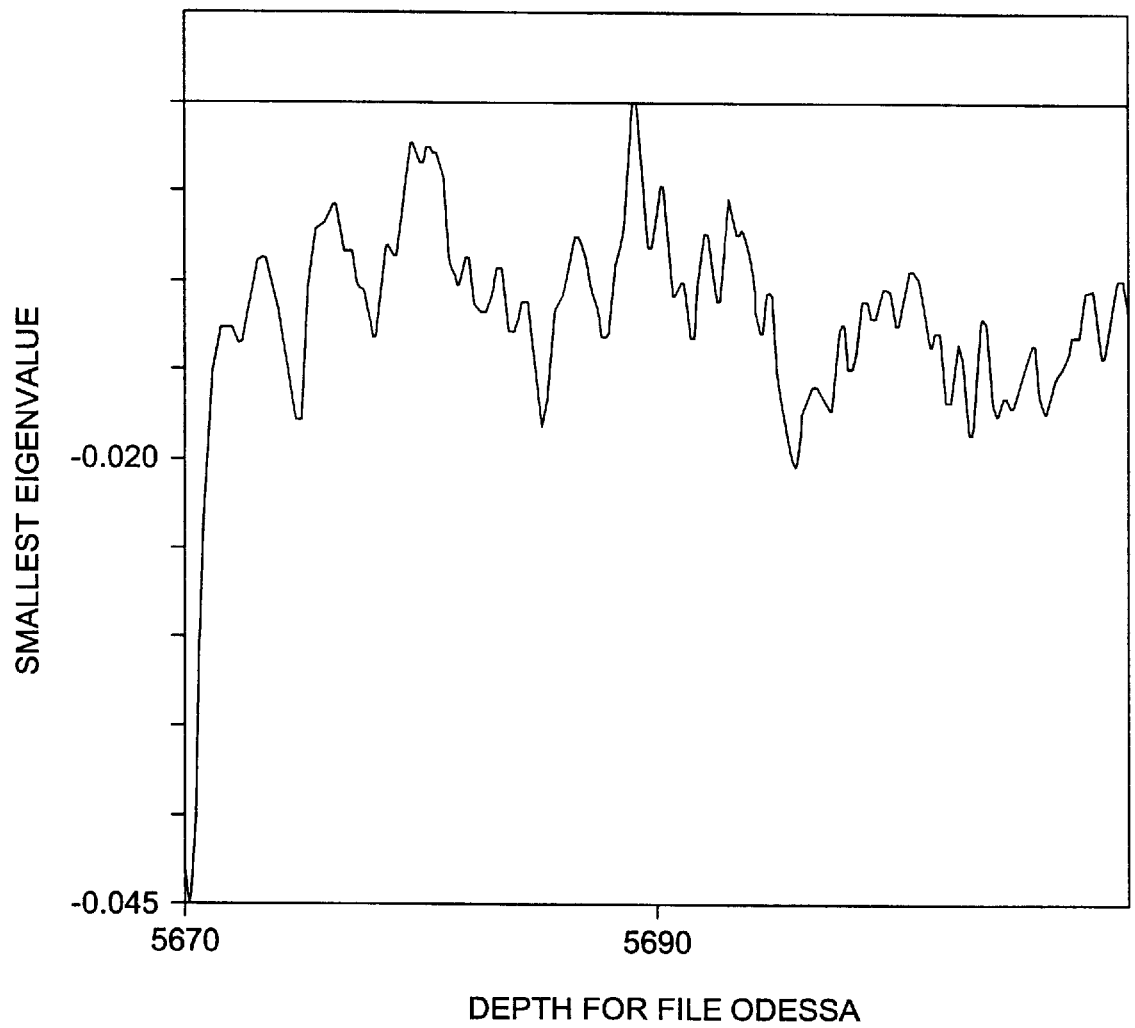
Figure 13A:
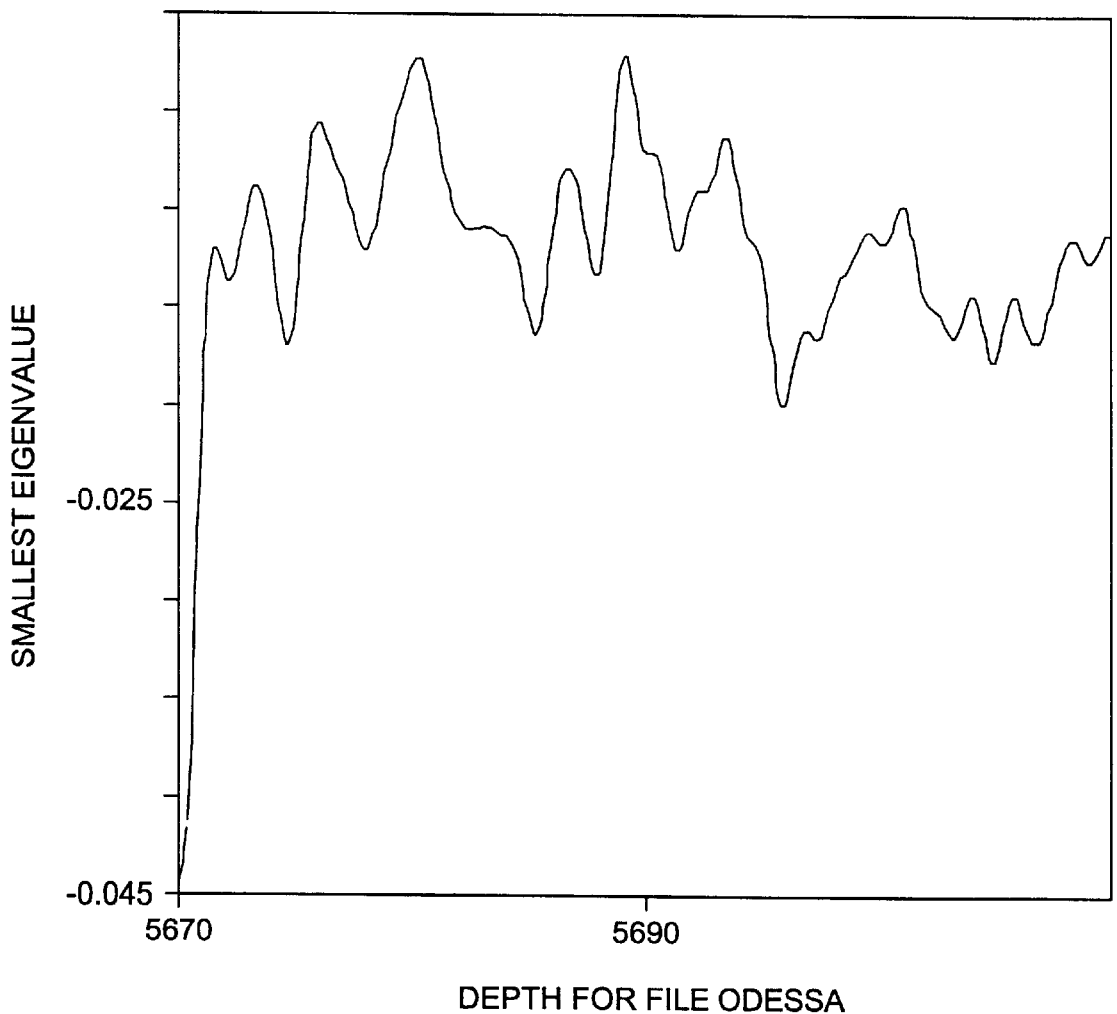

FIGS. 10–13A, respectively, show graphs of the absolutely smallest eigenvalues corresponding to the well logs produced over the same depth intervals as shown in FIGS. 6–9A. It can be observed in FIGS. 10, 12 and 13, in particular, that spikes, such as shown at 81 in FIG. 8 and at 91 in FIG. 9 correspond to depth positions where there is a change in sign of the absolutely smallest eigenvalue. The section of well log shown in FIG. 7 does not exhibit spikes and its corresponding eigenvalue graph, FIG. 11, does not exhibit any intervals where the eigenvalues change sign. Similarly, FIG. 8A shows final results after both phase shift and eigenvalue shifting. FIG. 9A shows final results after phase synthesis and eigenvalue shifting. The corresponding eigenvalue graphs are shown, respectively, in FIGS. 12A and 13A.

Figure 14:
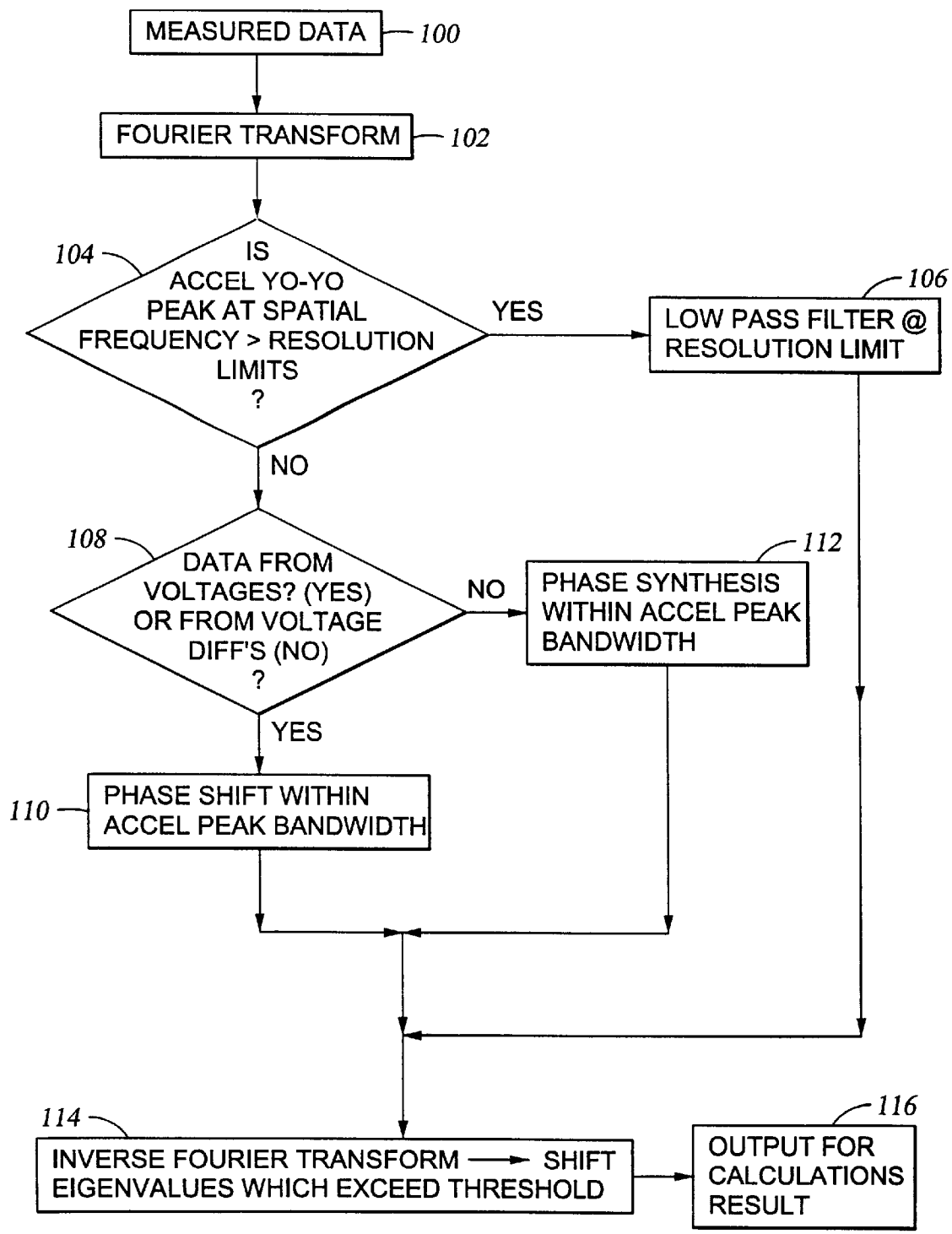
FIG. 14 shows a flow chart of the process of the invention.

FIG. 14 shows a flow chart of the process of the invention. The data measured by the various sensors on the logging instrument are shown at 100. The data, including the accelerometer data, are Fourier transformed to the spatial frequency domain at box 102. At decision box 104, the spatial frequency of the accelerometer yo-yo peak is compared to the resolution limit of the data from each sensor. If the accelerometer peak has a spatial frequency above the resolution limit of a particular sensor, then its Fouriertransformed data can be low pass filtered, at 106, to the resolution limit of the particular sensor. No low pass filtering is done if the accelerometer peak is below the resolution limit of the particular sensor.

At decision box, 108, those data measured as voltages (yes at box 108) and measured as voltage differences (no at box 108) are selected for processing by phase shifting or phase synthesis, respectively. Data representing voltages from each of the sensors can be corrected by phase shifting (within the bandwidth of the accelerometer peak), as shown at box 110, while voltage difference data can be corrected by phase synthesis (within the bandwidth of the accelerometer peak), as shown at box 112. At box 114, the phase synthesized, and/or phase shifted data are then inverse Fourier transformed, and eigenvalues in a matrix, of a system of linear equations for converting the data into calculated output, are then shifted where the smallest absolute value ones of the eigenvalues exceed a preselected threshold (which is typically where the smallest absolute eigenvalue changes sign, as previously explained). This provides, at box 116, corrected output for calculating the formation properties of interest from the instrument data.

The method of the present invention has been described above with reference to a specific type of logging tool, namely, a focused electrical resistivity sensor. Those versed in the art would recognize that it could be used equally well with any other array logging tool that uses an equation of the form (1) in the interpretation of data. For example, the analysis of data obtained using a multi-element acoustic logging tool involves such an equation for obtaining compressional and shear velocities of the formation from measurements of compressional and shear velocity travel times. An equation of the same form is involved in measurements of the amplitude and phase of an electromagnetic wave in induction and propagation logging tools for obtaining formation resistivity. An equation of the form (1) is also involved in borehole imaging applications using resistivity or sonic measurements. It is also possible to use the invention described above with a neutron logging tool or a gamma ray logging tool. In each of the applications discussed above, those versed in the art would be familiar with formulating the interpretation of the measurements by an equation of the form (1).

Those versed in the art would recognize that the motion sensor on the instrument could, instead of an accelerometer, be a velocity sensor such as a geophone. A gyroscope may also be used to measure the axial motion of the tool. The output of such a velocity phone or gyroscope can be processed by the processor to give the axial acceleration of the instrument for use in the processing discussed above.

Those skilled in the art will devise other embodiments of this invention which do not depart from the spirit of the invention as disclosed herein. Accordingly, the invention should be limited in scope only by the attached claims.

What is claimed is:

1. A method of obtaining a parameter of interest of a formation surrounding a borehole, the method comprising:
   (a) conveying an instrument in the borehole for making a plurality of measurements indicative of the parameter of interest, said measurements being affected by instrument yo-yo;
   (b) defining a matrix forming part of a system of linear equations relating the measurements to the parameter of interest;
   (c) obtaining an estimate of motion of the instrument and applying a preliminary correction to the measurements therefrom;
   (d) shifting eigenvalues of said matrix by an amount related to the smallest eigenvalue of said matrix to give an adjusted matrix; and
   (e) using said adjusted matrix to give the parameter of interest.

2. The method of claim 1 wherein the parameter of interest is one of (i) a horizontal resistivity of the formation, (ii) a vertical resistivity of the formation, (iii) a density of the formation, (iii) a compressional velocity of the formation, (iv) a shear velocity of the formation, (v) resistivity image of the borehole, and (vi) sonic image of the borehole.

3. The method of claim 1 wherein said plurality of measurements are selected from the group consisting of (i) a compressional wave travel time through the formation, (ii) a shear wave travel time through the formation, (iii) a measurement of an electric current through the formation, (iv) a measurement of an amplitude of an electromagnetic wave, (v) a measurement of a phase of an electromagnetic wave, (v) a measurement of neutron counts(vi) a measurement of gamma ray amplitude, (vii) measurement of a potential difference, (viii) measurement of a compressional wave traveltime from the instrument to a wall of the borehole, and, (ix) measurement of an amplitude of a compressional wave reflected from a wall of the borehole.

4. The method of claim 1 wherein applying a preliminary correction further comprises low pass filtering below approximately an axial resolution limit of said data when a lowermost spatial frequency of said yo-yo exceeds said axial resolution limit, wherein said axial resolution limit is obtained from one of (i) data from a motion sensor on the instrument, and, (ii) processing said plurality of measurements using a processor.

5. The method of claim 1 wherein applying a preliminary correction further comprises shifting a phase of a response of a first sensor in said logging instrument to substantially match a phase of a response of a second sensor in said logging instrument, said phase shift performed within said spatial frequency bandwidth of said cable yo-yo.

6. The method of claim 4 wherein said axial resolution limit is obtained from data from a motion sensor on the instrument wherein said motion sensor is selected from the group consisting of (A) an accelerometer, (B) a gyroscope, and, (C) a geophone.

7. The method of claim 4 wherein said axial resolution limit is derived from the plurality of measurements.

8. The method of claim 1 wherein shifting the eigenvalues of said matrix further comprises determining said smallest absolute value said eigenvalues and adjusting said eigenvalues so that said smallest absolute eigenvalue does not change sign.

9. The method of claim 1 wherein applying a preliminary correction further comprises phase synthesis of data recorded by a first sensor in said logging instrument to substantially match a phase of a response of a second sensor in said logging instrument wherein said first and said second sensor are spaced apart by a fixed distance along said instrument, said phase synthesis performed within said spatial frequency bandwidth of said cable yo-yo.

10. The method of claim 8 further comprising performing a singular value decomposition (SVD) of an eigenvector matrix corresponding to said matrix and using the result of said SVD for determining the parameter of interest.

11. The method of claim 1 wherein a bandwidth of said cable yo-yo is determined by Fourier analysis of data from a motion sensor on the instrument wherein said motion sensor is selected from the group consisting of (A) an accelerometer, (B) a gyroscope, and, (C) a geophone.

12. The method of claim 1 wherein said matrix corresponds to an operation that is one of (i) a deconvolution operation, and, (ii) a filtering operation.

13. A method for logging a wellbore drilled through earth formations, comprising:
(a) measuring output, at a first axial position in said wellbore, of sensors positioned at axially spaced apart locations from an excitation source, said output including output of first selected ones of said sensors corresponding to a parameter of interest of a selected interval in said earth formations;
(b) measuring output, at a second axial position in said wellbore, of said sensors, said second axial position selected so that output from second selected ones of said sensors correspond to said parameter of interest in said selected interval as said output from said first selected ones of said sensors at said first axial position;
(c) preprocessing said output from said first and said second axial positions to reduce magnitude of spatial frequency components in said output occurring within a spatial frequency bandwidth of said cable yo-yo;
(d) shifting eigenvalues of said matrix by an amount related to the smallest eigenvalue of said matrix to give an adjusted matrix; and
(f) using said adjusted matrix to give the parameter of interest.

14. The method of claim 13 wherein the parameter of interest is one of (i) a horizontal resistivity of the formation, (ii) a vertical resistivity of the formation, (iii) a density of the formation, (iii) a compressional velocity of the formation, (iv) a shear velocity of the formation, (v) resistivity image of the borehole, and (vi) sonic image of the borehole.

15. The method of claim 13 wherein said first and second selected ones of sensors are response to one (i) a compressional wave travel time through the formation, (ii) a shear wave travel time through the formation, (iii) a measurement of an electric current through the formation, (iv) a measurement of an amplitude of an electromagnetic wave, (v) a measurement of a phase of an electromagnetic wave, (v) a measurement of neutron counts(vi) a measurement of gamma ray amplitude, (vii) measurement of a potential difference, (viii) measurement of a compressional wave traveltime from the instrument to a wall of the borehole, and, (ix) measurement of an amplitude of a compressional wave reflected from a wall of the borehole.

16. The method as defined in claim 13 wherein said step of preprocessing comprises low pass filtering below approximately an axial resolution limit of said sensors when a lowermost spatial frequency of said yo-yo exceeds said axial resolution limit.

17. The method as defined in claim 13 wherein said step of preprocessing comprises shifting a phase of a response of a first one of said sensors to substantially match a phase of a response of a second one of said sensors, said phase shift performed within said spatial frequency bandwidth of said cable yo-yo.

18. The method as defined in claim 13 wherein said step of preprocessing comprises phase synthesis of said output from said first axial position to match a response of said output from said second axial position, said phase synthesis performed within said bandwidth of said cable yo-yo.

19. The method of claim 13 wherein shifting the eigenvalues of said matrix further comprises determining said smallest absolute value said eigenvalues and adjusting said eigenvalues so that said smallest absolute eigenvalue does not change sign.

20. The method of claim 19 further comprising performing performing a singular value decomposition (SVD) of an eigenvector matrix corresponding to said matrix and using the result of said SVD for determining the parameter of interest.

21. The method of claim 13 wherein a bandwidth of said cable yo-yo is determined by Fourier analysis of data from a motion sensor on the instrument.

22. The method of claim 21 wherein said motion sensor is selected from the group consisting of an accelerometer, a gyroscope, and a geophone.

23. The method of claim 13 wherein said matrix corresponds to an operation that is one of (i) a deconvolution operation, and, (ii) a filtering operation.

* * * * *